US008095260B1

(12) United States Patent
Schofield et al.

(10) Patent No.: US 8,095,260 B1
(45) Date of Patent: Jan. 10, 2012

(54) VEHICLE INFORMATION DISPLAY

(75) Inventors: Kenneth Schofield, Holland, MI (US);
Troy O. Cooprider, Rochester, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/229,965

(22) Filed: Sep. 12, 2011

Related U.S. Application Data

(63) Continuation of application No. 13/006,905, filed on Jan. 14, 2011, now Pat. No. 8,019,505, which is a continuation of application No. 12/776,787, filed on May 10, 2010, now Pat. No. 7,873,593, which is a continuation of application No. 12/428,571, filed on Apr. 23, 2009, now Pat. No. 7,734,392, which is a continuation of application No. 11/953,362, filed on Dec. 10, 2007, now Pat. No. 7,526,367, which is a continuation of application No. 10/964,512, filed on Oct. 13, 2004, now Pat. No. 7,308,341.

(60) Provisional application No. 60/511,231, filed on Oct. 14, 2003.

(51) Int. Cl.
*B60R 1/12* (2006.01)

(52) U.S. Cl. ............................ 701/29; 701/36; 340/438

(58) Field of Classification Search .................. None
See application file for complete search history.

(56) References Cited

U.S. PATENT DOCUMENTS

| 1,096,452 | A | 5/1914 | Perrin |
| 1,563,258 | A | 11/1925 | Cunningham |
| 2,069,368 | A | 2/1937 | Horinstein |
| 2,166,303 | A | 7/1939 | Hodny et al. |
| 2,263,382 | A | 11/1941 | Gotzinger |
| 2,414,223 | A | 1/1947 | DeVirgilis |
| 2,457,348 | A | 12/1948 | Chambers |
| 2,561,582 | A | 7/1951 | Marbel |
| 2,580,014 | A | 12/1951 | Gazda |
| 3,004,473 | A | 10/1961 | Arthur et al. |

(Continued)

FOREIGN PATENT DOCUMENTS

AU     A-40317/95     2/1995

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Michael J. Zanelli
(74) *Attorney, Agent, or Firm* — Gardner, Linn, Burkhart & Flory, LLP

(57) ABSTRACT

An information display system for a vehicle includes a display screen disposed at an interior cabin of a vehicle so as to be viewable by a driver of the equipped vehicle. The information display system is operable to display on the display screen vehicle user information so as to provide information to the driver of the equipped vehicle related to use of the equipped vehicle. The display screen is operable to display video images captured by a rearward facing camera of the equipped vehicle for assisting the driver during a reversing maneuver. The video images are captured by the rearward facing camera and are displayed on the display screen when the equipped vehicle is executing a reversing maneuver. When the equipped vehicle is not executing a reversing maneuver, the information display system is operable to display on the display screen vehicle user information.

38 Claims, 3 Drawing Sheets

U.S. PATENT DOCUMENTS

| | | |
|---|---|---|
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |

| Patent No. | Date | Name |
|---|---|---|
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,153 A * | 9/1992 | Haymond ................ 345/168 |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |

| | | |
|---|---|---|
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |

| | | | | | |
|---|---|---|---|---|---|
| 5,737,226 A | 4/1998 | Olson et al. | 5,899,551 A | 5/1999 | Neijzen et al. |
| 5,741,966 A | 4/1998 | Handfield et al. | 5,899,956 A | 5/1999 | Chan |
| 5,744,227 A | 4/1998 | Bright et al. | 5,904,729 A | 5/1999 | Ruzicka |
| 5,745,050 A | 4/1998 | Nakagawa | 5,910,854 A | 6/1999 | Varaprasad et al. |
| 5,745,266 A | 4/1998 | Smith | 5,914,815 A | 6/1999 | Bos |
| 5,748,172 A | 5/1998 | Song et al. | 5,917,664 A | 6/1999 | O'Neill et al. |
| 5,748,287 A | 5/1998 | Takahashi et al. | 5,918,180 A | 6/1999 | Dimino |
| 5,751,211 A | 5/1998 | Shirai et al. | 5,922,176 A | 7/1999 | Caskey |
| 5,751,246 A | 5/1998 | Hertel | 5,923,027 A | 7/1999 | Stam et al. |
| 5,751,390 A | 5/1998 | Crawford et al. | 5,923,457 A | 7/1999 | Byker et al. |
| 5,751,489 A | 5/1998 | Caskey et al. | 5,924,212 A | 7/1999 | Domanski |
| 5,754,099 A | 5/1998 | Nishimura et al. | 5,926,087 A | 7/1999 | Busch et al. |
| D394,833 S | 6/1998 | Muth | 5,927,792 A | 7/1999 | Welling et al. |
| 5,760,828 A | 6/1998 | Cortes | 5,928,572 A | 7/1999 | Tonar et al. |
| 5,760,931 A | 6/1998 | Saburi et al. | 5,929,786 A | 7/1999 | Schofield et al. |
| 5,760,962 A | 6/1998 | Schofield et al. | 5,935,702 A | 8/1999 | Macquart et al. |
| 5,761,094 A | 6/1998 | Olson et al. | 5,938,320 A | 8/1999 | Crandall |
| 5,762,823 A | 6/1998 | Hikmet | 5,938,321 A | 8/1999 | Bos et al. |
| 5,764,139 A | 6/1998 | Nojima et al. | 5,938,721 A | 8/1999 | Dussell et al. |
| 5,765,940 A | 6/1998 | Levy et al. | 5,940,011 A | 8/1999 | Agravante et al. |
| 5,767,793 A | 6/1998 | Agravante et al. | 5,940,120 A | 8/1999 | Frankhouse et al. |
| 5,768,020 A | 6/1998 | Nagao | 5,940,201 A | 8/1999 | Ash et al. |
| 5,775,762 A | 7/1998 | Vitito | 5,942,895 A | 8/1999 | Popovic et al. |
| 5,777,779 A | 7/1998 | Hashimoto et al. | 5,947,586 A | 9/1999 | Weber |
| 5,780,160 A | 7/1998 | Allemand et al. | 5,949,331 A | 9/1999 | Schofield et al. |
| 5,786,772 A | 7/1998 | Schofield et al. | 5,949,345 A * | 9/1999 | Beckert et al. ............ 340/815.41 |
| 5,788,357 A | 8/1998 | Muth et al. | 5,956,079 A | 9/1999 | Ridgley |
| 5,790,298 A | 8/1998 | Tonar | 5,956,181 A | 9/1999 | Lin |
| 5,790,502 A | 8/1998 | Horinouchi et al. | 5,959,367 A | 9/1999 | O'Farrell et al. |
| 5,790,973 A | 8/1998 | Blaker et al. | 5,959,555 A | 9/1999 | Furuta |
| 5,793,308 A | 8/1998 | Rosinski et al. | 5,959,577 A | 9/1999 | Fan et al. |
| 5,793,420 A | 8/1998 | Schmidt | 5,963,247 A | 10/1999 | Banitt |
| 5,796,094 A | 8/1998 | Schofield et al. | 5,965,247 A | 10/1999 | Jonza et al. |
| 5,796,176 A | 8/1998 | Kramer et al. | 5,968,538 A | 10/1999 | Snyder, Jr. |
| 5,798,057 A | 8/1998 | Hikmet | 5,971,552 A | 10/1999 | O'Farrell et al. |
| 5,798,575 A | 8/1998 | O'Farrell et al. | 5,973,760 A | 10/1999 | Dehmlow |
| 5,798,688 A | 8/1998 | Schofield | 5,975,715 A | 11/1999 | Bauder |
| 5,800,918 A | 9/1998 | Chartier et al. | 5,984,482 A | 11/1999 | Rumsey et al. |
| 5,802,727 A | 9/1998 | Blank et al. | 5,986,730 A | 11/1999 | Hansen et al. |
| 5,803,579 A | 9/1998 | Turnbull et al. | 5,990,469 A | 11/1999 | Bechtel et al. |
| 5,805,330 A | 9/1998 | Byker et al. | 5,990,625 A | 11/1999 | Meissner et al. |
| 5,805,367 A | 9/1998 | Kanazawa | 5,995,180 A | 11/1999 | Moriwaki et al. |
| 5,806,879 A | 9/1998 | Hamada et al. | 5,998,617 A | 12/1999 | Srinivasa et al. |
| 5,806,965 A | 9/1998 | Deese | 5,998,929 A | 12/1999 | Bechtel et al. |
| 5,808,197 A | 9/1998 | Dao | 6,000,823 A | 12/1999 | Desmond et al. |
| 5,808,566 A | 9/1998 | Behr et al. | 6,001,486 A | 12/1999 | Varaprasad et al. |
| 5,808,589 A | 9/1998 | Fergason | 6,002,511 A | 12/1999 | Varaprasad et al. |
| 5,808,713 A | 9/1998 | Broer et al. | 6,002,983 A | 12/1999 | Alland et al. |
| 5,808,777 A | 9/1998 | Lynam et al. | 6,005,724 A | 12/1999 | Todd |
| 5,808,778 A | 9/1998 | Bauer et al. | 6,007,222 A | 12/1999 | Thau |
| 5,812,321 A | 9/1998 | Schierbeek et al. | 6,008,486 A | 12/1999 | Stam et al. |
| 5,813,745 A | 9/1998 | Fant, Jr. et al. | 6,008,871 A | 12/1999 | Okumura |
| 5,818,625 A | 10/1998 | Forgette et al. | 6,009,359 A | 12/1999 | El-Hakim et al. |
| 5,820,097 A | 10/1998 | Spooner | 6,016,035 A | 1/2000 | Eberspächer et al. |
| 5,820,245 A | 10/1998 | Desmond et al. | 6,016,215 A | 1/2000 | Byker |
| 5,822,023 A | 10/1998 | Suman et al. | 6,019,411 A | 2/2000 | Carter et al. |
| 5,823,654 A | 10/1998 | Pastrick et al. | 6,019,475 A | 2/2000 | Lynam et al. |
| 5,825,527 A | 10/1998 | Forgette et al. | 6,020,987 A | 2/2000 | Baumann et al. |
| 5,835,166 A | 11/1998 | Hall et al. | 6,021,371 A | 2/2000 | Fultz |
| 5,837,994 A | 11/1998 | Stam et al. | 6,023,229 A | 2/2000 | Bugno et al. |
| 5,844,505 A | 12/1998 | Van Ryzin | 6,025,872 A | 2/2000 | Ozaki et al. |
| 5,848,373 A | 12/1998 | DeLorme et al. | 6,028,537 A | 2/2000 | Suman et al. |
| 5,850,176 A | 12/1998 | Kinoshita et al. | 6,037,689 A | 3/2000 | Bingle et al. |
| 5,850,205 A | 12/1998 | Blouin | 6,040,939 A | 3/2000 | Demiryont et al. |
| 5,863,116 A | 1/1999 | Pastrick et al. | 6,042,253 A | 3/2000 | Fant, Jr. et al. |
| 5,864,419 A | 1/1999 | Lynam | 6,042,934 A | 3/2000 | Guiselin et al. |
| 5,867,801 A | 2/1999 | Denny | 6,045,243 A | 4/2000 | Muth et al. |
| 5,871,275 A | 2/1999 | O'Farrell et al. | 6,045,643 A | 4/2000 | Byker et al. |
| 5,871,843 A | 2/1999 | Yoneda et al. | 6,046,766 A | 4/2000 | Sakata |
| 5,877,707 A | 3/1999 | Kowalick | 6,046,837 A | 4/2000 | Yamamoto |
| 5,877,897 A | 3/1999 | Schofield et al. | 6,049,171 A | 4/2000 | Stam et al. |
| 5,878,353 A | 3/1999 | ul Azam et al. | D425,466 S | 5/2000 | Todd et al. |
| 5,878,370 A | 3/1999 | Olson | 6,060,989 A | 5/2000 | Gehlot |
| 5,879,074 A | 3/1999 | Pastrick | 6,061,002 A | 5/2000 | Weber et al. |
| 5,883,605 A | 3/1999 | Knapp | 6,062,920 A | 5/2000 | Jordan et al. |
| 5,883,739 A | 3/1999 | Ashihara et al. | 6,064,508 A | 5/2000 | Forgette et al. |
| 5,888,431 A | 3/1999 | Tonar et al. | 6,065,840 A | 5/2000 | Caskey et al. |
| 5,894,196 A | 4/1999 | McDermott | 6,066,920 A | 5/2000 | Torihara et al. |
| D409,540 S | 5/1999 | Muth | 6,067,111 A | 5/2000 | Hahn et al. |

| | | | | | | |
|---|---|---|---|---|---|---|
| 6,067,500 | A | 5/2000 | Morimoto et al. | 6,167,255 A | 12/2000 | Kennedy, III et al. |
| 6,068,380 | A | 5/2000 | Lynn et al. | 6,167,755 B1 | 1/2001 | Damson et al. |
| D426,506 | S | 6/2000 | Todd et al. | 6,169,955 B1 | 1/2001 | Fultz |
| D426,507 | S | 6/2000 | Todd et al. | 6,170,956 B1 | 1/2001 | Rumsey et al. |
| D427,128 | S | 6/2000 | Mathieu | 6,172,600 B1 | 1/2001 | Kakinami et al. |
| 6,072,391 | A | 6/2000 | Suzukie et al. | 6,172,601 B1 | 1/2001 | Wada et al. |
| 6,074,077 | A | 6/2000 | Pastrick et al. | 6,172,613 B1 | 1/2001 | DeLine et al. |
| 6,074,777 | A | 6/2000 | Reimers et al. | 6,173,501 B1 | 1/2001 | Blank et al. |
| 6,076,948 | A | 6/2000 | Bukosky et al. | 6,175,164 B1 | 1/2001 | O'Farrell et al. |
| 6,078,355 | A | 6/2000 | Zengel | 6,175,300 B1 | 1/2001 | Kendrick |
| 6,078,865 | A | 6/2000 | Koyanagi | 6,176,602 B1 | 1/2001 | Pastrick et al. |
| D428,372 | S | 7/2000 | Todd et al. | 6,178,034 B1 | 1/2001 | Allemand et al. |
| D428,373 | S | 7/2000 | Todd et al. | 6,178,377 B1 | 1/2001 | Ishihara et al. |
| 6,082,881 | A | 7/2000 | Hicks | 6,181,387 B1 | 1/2001 | Rosen |
| 6,084,700 | A | 7/2000 | Knapp et al. | 6,182,006 B1 | 1/2001 | Meek |
| 6,086,131 | A | 7/2000 | Bingle et al. | 6,183,119 B1 | 2/2001 | Desmond et al. |
| 6,086,229 | A | 7/2000 | Pastrick | 6,184,679 B1 | 2/2001 | Popovic et al. |
| 6,087,012 | A | 7/2000 | Varaprasad et al. | 6,184,781 B1 | 2/2001 | Ramakesavan |
| 6,087,953 | A | 7/2000 | DeLine et al. | 6,185,492 B1 | 2/2001 | Kagawa et al. |
| 6,091,343 | A | 7/2000 | Dykema et al. | 6,185,501 B1 | 2/2001 | Smith et al. |
| 6,093,976 | A | 7/2000 | Kramer et al. | 6,188,505 B1 | 2/2001 | Lomprey et al. |
| 6,094,618 | A | 7/2000 | Harada | 6,191,704 B1 | 2/2001 | Takenaga et al. |
| D428,842 | S | 8/2000 | Todd et al. | 6,193,912 B1 | 2/2001 | Thieste et al. |
| D429,202 | S | 8/2000 | Todd et al. | 6,195,194 B1 | 2/2001 | Roberts et al. |
| D430,088 | S | 8/2000 | Todd et al. | 6,196,688 B1 | 3/2001 | Caskey et al. |
| 6,097,023 | A | 8/2000 | Schofield et al. | 6,198,409 B1 | 3/2001 | Schofield et al. |
| 6,097,316 | A | 8/2000 | Liaw et al. | 6,199,014 B1 | 3/2001 | Walker et al. |
| 6,099,131 | A | 8/2000 | Fletcher et al. | 6,199,810 B1 | 3/2001 | Wu et al. |
| 6,099,155 | A | 8/2000 | Pastrick et al. | 6,200,010 B1 | 3/2001 | Anders |
| 6,102,546 | A | 8/2000 | Carter | 6,201,642 B1 | 3/2001 | Bos |
| 6,102,559 | A | 8/2000 | Nold et al. | 6,206,553 B1 | 3/2001 | Boddy et al. |
| 6,104,552 | A | 8/2000 | Thau et al. | 6,207,083 B1 | 3/2001 | Varaprasad et al. |
| 6,106,121 | A | 8/2000 | Buckley et al. | 6,210,008 B1 | 4/2001 | Hoekstra et al. |
| 6,111,498 | A | 8/2000 | Jobes, I et al. | 6,210,012 B1 | 4/2001 | Broer |
| 6,111,683 | A | 8/2000 | Cammenga et al. | 6,212,470 B1 | 4/2001 | Seymour et al. |
| 6,111,684 | A | 8/2000 | Forgette et al. | 6,217,181 B1 | 4/2001 | Lynam et al. |
| 6,111,685 | A | 8/2000 | Tench et al. | 6,218,934 B1 | 4/2001 | Regan |
| 6,111,696 | A | 8/2000 | Allen et al. | 6,222,447 B1 | 4/2001 | Schofield et al. |
| 6,115,086 | A | 9/2000 | Rosen | 6,222,460 B1 | 4/2001 | DeLine et al. |
| 6,115,651 | A | 9/2000 | Cruz | 6,222,689 B1 | 4/2001 | Higuchi et al. |
| 6,116,743 | A | 9/2000 | Hoek | 6,227,689 B1 | 5/2001 | Miller |
| 6,118,219 | A | 9/2000 | Okigami et al. | 6,232,937 B1 | 5/2001 | Jacobsen et al. |
| 6,122,597 | A | 9/2000 | Saneyoshi et al. | 6,236,514 B1 | 5/2001 | Sato |
| 6,122,921 | A | 9/2000 | Brezoczky et al. | 6,239,851 B1 | 5/2001 | Hatazawa et al. |
| 6,124,647 | A | 9/2000 | Marcus et al. | 6,239,898 B1 | 5/2001 | Byker et al. |
| 6,124,886 | A | 9/2000 | DeLine et al. | 6,239,899 B1 | 5/2001 | DeVries et al. |
| 6,127,919 | A | 10/2000 | Wylin | 6,243,003 B1 | 6/2001 | DeLine et al. |
| 6,127,945 | A | 10/2000 | Mura-Smith | 6,244,716 B1 | 6/2001 | Steenwyk et al. |
| 6,128,576 | A | 10/2000 | Nishimoto et al. | 6,245,262 B1 | 6/2001 | Varaprasad et al. |
| 6,130,421 | A | 10/2000 | Bechtel et al. | 6,247,820 B1 | 6/2001 | Van Order |
| 6,130,448 | A | 10/2000 | Bauer et al. | 6,249,214 B1 | 6/2001 | Kashiwazaki |
| 6,132,072 | A | 10/2000 | Turnbull et al. | 6,249,310 B1 | 6/2001 | Lefkowitz |
| 6,137,620 | A | 10/2000 | Guarr et al. | 6,249,369 B1 | 6/2001 | Theiste et al. |
| 6,139,171 | A | 10/2000 | Waldmann | 6,250,148 B1 | 6/2001 | Lynam |
| 6,139,172 | A | 10/2000 | Bos et al. | 6,250,766 B1 | 6/2001 | Strumolo et al. |
| 6,140,933 | A | 10/2000 | Bugno et al. | 6,250,783 B1 | 6/2001 | Stidham et al. |
| 6,142,656 | A | 11/2000 | Kurth | 6,255,639 B1 | 7/2001 | Stam et al. |
| 6,146,003 | A | 11/2000 | Thau | 6,257,746 B1 | 7/2001 | Todd et al. |
| 6,147,934 | A | 11/2000 | Arikawa et al. | 6,259,412 B1 | 7/2001 | Duroux |
| 6,148,261 | A | 11/2000 | Obradovich et al. | 6,259,475 B1 | 7/2001 | Ramachandran et al. |
| 6,149,287 | A | 11/2000 | Pastrick et al. | 6,260,608 B1 | 7/2001 | Kim |
| 6,150,014 | A | 11/2000 | Chu et al. | 6,262,842 B1 | 7/2001 | Ouderkirk et al. |
| 6,151,065 | A | 11/2000 | Steed et al. | 6,264,353 B1 | 7/2001 | Caraher et al. |
| 6,151,539 | A | 11/2000 | Bergholz et al. | 6,265,968 B1 | 7/2001 | Betzitza et al. |
| 6,152,551 | A | 11/2000 | Annas | 6,268,803 B1 | 7/2001 | Gunderson et al. |
| 6,152,590 | A | 11/2000 | Fürst et al. | 6,268,837 B1 | 7/2001 | Kobayashi et al. |
| 6,154,149 | A | 11/2000 | Tyckowski et al. | 6,269,308 B1 | 7/2001 | Kodaka et al. |
| 6,154,306 | A | 11/2000 | Varaprasad et al. | 6,271,901 B1 | 8/2001 | Ide et al. |
| 6,157,294 | A | 12/2000 | Urai et al. | 6,274,221 B2 | 8/2001 | Smith et al. |
| 6,157,418 | A | 12/2000 | Rosen | 6,276,821 B1 | 8/2001 | Pastrick et al. |
| 6,157,480 | A | 12/2000 | Anderson et al. | 6,276,822 B1 | 8/2001 | Bedrosian et al. |
| 6,158,655 | A | 12/2000 | DeVries, Jr. et al. | 6,277,471 B1 | 8/2001 | Tang |
| 6,161,865 | A | 12/2000 | Rose et al. | 6,278,271 B1 | 8/2001 | Schott |
| 6,164,564 | A | 12/2000 | Franco et al. | 6,278,377 B1 | 8/2001 | DeLine et al. |
| 6,166,625 | A | 12/2000 | Teowee et al. | 6,278,941 B1 | 8/2001 | Yokoyama |
| 6,166,629 | A | 12/2000 | Hamma et al. | 6,280,068 B1 | 8/2001 | Mertens et al. |
| 6,166,834 | A | 12/2000 | Taketomi et al. | 6,280,069 B1 | 8/2001 | Pastrick et al. |
| 6,166,847 | A | 12/2000 | Tench et al. | 6,281,804 B1 | 8/2001 | Haller et al. |
| 6,166,848 | A | 12/2000 | Cammenga et al. | 6,286,965 B1 | 9/2001 | Caskey et al. |

| Patent No. | Date | Name |
|---|---|---|
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B2 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chutorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,574,531 B2 * | 6/2003 | Tan et al. ............ 701/1 |

| | | |
|---|---|---|
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | Deline et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,667,726 B1 * | 12/2003 | Damiani et al. ............... 345/1.1 |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsburg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouilliard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |

| Patent | Type | Date | Inventor |
|---|---|---|---|
| 6,906,632 | B2 | 6/2005 | DeLine et al. |
| 6,909,486 | B2 | 6/2005 | Wang et al. |
| 6,910,779 | B2 | 6/2005 | Abel et al. |
| 6,912,396 | B2 | 6/2005 | Sziraki et al. |
| 6,914,521 | B2 | 7/2005 | Rothkop |
| 6,916,099 | B2 | 7/2005 | Su et al. |
| 6,917,404 | B2 | 7/2005 | Baek |
| 6,918,674 | B2 | 7/2005 | Drummond et al. |
| 6,922,902 | B2 | 8/2005 | Schierbeek et al. |
| 6,928,180 | B2 | 8/2005 | Stam et al. |
| 6,928,366 | B2 | 8/2005 | Ockerse et al. |
| 6,930,737 | B2 | 8/2005 | Weindorf et al. |
| 6,933,837 | B2 | 8/2005 | Gunderson et al. |
| 6,934,067 | B2 | 8/2005 | Ash et al. |
| 6,940,423 | B2 | 9/2005 | Takagi et al. |
| 6,946,978 | B2 | 9/2005 | Schofield |
| 6,947,576 | B2 | 9/2005 | Stam et al. |
| 6,947,577 | B2 | 9/2005 | Stam et al. |
| 6,949,772 | B2 | 9/2005 | Shimizu et al. |
| 6,950,035 | B2 | 9/2005 | Tanaka et al. |
| 6,951,410 | B2 | 10/2005 | Parsons |
| 6,951,681 | B2 | 10/2005 | Hartley et al. |
| 6,952,312 | B2 | 10/2005 | Weber et al. |
| 6,958,495 | B2 | 10/2005 | Nishijima et al. |
| 6,958,683 | B2 | 10/2005 | Mills et al. |
| 6,959,994 | B2 | 11/2005 | Fujikawa et al. |
| 6,961,178 | B2 | 11/2005 | Sugino et al. |
| 6,961,661 | B2 | 11/2005 | Sekiguchi |
| 6,963,438 | B2 | 11/2005 | Busscher et al. |
| 6,968,273 | B2 | 11/2005 | Ockerse et al. |
| 6,971,181 | B2 | 12/2005 | Ohm et al. |
| 6,972,888 | B2 | 12/2005 | Poll et al. |
| 6,974,236 | B2 | 12/2005 | Tenmyo |
| 6,975,215 | B2 | 12/2005 | Schofield et al. |
| 6,977,702 | B2 | 12/2005 | Wu |
| 6,980,092 | B2 | 12/2005 | Turnbull et al. |
| 6,985,291 | B2 | 1/2006 | Watson et al. |
| 6,989,736 | B2 | 1/2006 | Berberich et al. |
| 6,992,573 | B2 | 1/2006 | Blank et al. |
| 6,992,718 | B1 | 1/2006 | Takahara |
| 6,992,826 | B2 | 1/2006 | Wong |
| 6,995,687 | B2 | 2/2006 | Lang et al. |
| 6,997,571 | B2 | 2/2006 | Tenmyo |
| 7,001,058 | B2 | 2/2006 | Inditsky |
| 7,004,592 | B2 | 2/2006 | Varaprasad et al. |
| 7,004,593 | B2 | 2/2006 | Weller et al. |
| 7,005,974 | B2 | 2/2006 | McMahon et al. |
| 7,006,173 | B1 | 2/2006 | Hiyama et al. |
| 7,008,090 | B2 | 3/2006 | Blank |
| 7,009,751 | B2 | 3/2006 | Tonar et al. |
| 7,012,543 | B2 | 3/2006 | DeLine et al. |
| 7,012,727 | B2 | 3/2006 | Hutzel et al. |
| 7,023,331 | B2 | 4/2006 | Kodama |
| 7,029,156 | B2 | 4/2006 | Suehiro et al. |
| 7,030,738 | B2 | 4/2006 | Ishii |
| 7,030,775 | B2 | 4/2006 | Sekiguchi |
| 7,038,577 | B2 | 5/2006 | Pawlicki et al. |
| 7,041,965 | B2 | 5/2006 | Heslin et al. |
| 7,042,616 | B2 | 5/2006 | Tonar et al. |
| 7,046,418 | B2 | 5/2006 | Lin et al. |
| 7,046,448 | B2 | 5/2006 | Burgner |
| 7,050,908 | B1 | 5/2006 | Schwartz et al. |
| 7,057,505 | B2 | 6/2006 | Iwamoto |
| 7,057,681 | B2 | 6/2006 | Hinata et al. |
| 7,063,893 | B2 | 6/2006 | Hoffman |
| 7,064,882 | B2 | 6/2006 | Tonar et al. |
| 7,068,289 | B2 | 6/2006 | Satoh et al. |
| 7,074,486 | B2 | 7/2006 | Boire et al. |
| 7,081,810 | B2 | 7/2006 | Henderson et al. |
| 7,085,633 | B2 | 8/2006 | Nishira et al. |
| 7,092,052 | B2 | 8/2006 | Okamoto et al. |
| 7,095,432 | B2 | 8/2006 | Nakayama et al. |
| 7,095,567 | B2 | 8/2006 | Troxell et al. |
| 7,106,213 | B2 | 9/2006 | White |
| 7,106,392 | B2 | 9/2006 | You |
| 7,108,409 | B2 | 9/2006 | DeLine et al. |
| 7,110,021 | B2 | 9/2006 | Nobori et al. |
| 7,121,028 | B2 | 10/2006 | Shoen et al. |
| 7,125,131 | B2 | 10/2006 | Olczak |
| 7,130,727 | B2 | 10/2006 | Liu et al. |
| 7,132,064 | B2 | 11/2006 | Li et al. |
| 7,136,091 | B2 | 11/2006 | Ichikawa et al. |
| 7,138,974 | B2 | 11/2006 | Hirakata et al. |
| 7,149,613 | B2 | 12/2006 | Stam et al. |
| 7,150,552 | B2 | 12/2006 | Weidel |
| 7,151,515 | B2 | 12/2006 | Kim et al. |
| 7,151,997 | B2 | 12/2006 | Uhlmann et al. |
| 7,153,588 | B2 | 12/2006 | McMan et al. |
| 7,154,657 | B2 | 12/2006 | Poll et al. |
| 7,158,881 | B2 | 1/2007 | McCarthy et al. |
| 7,160,017 | B2 | 1/2007 | Lee et al. |
| 7,161,567 | B2 | 1/2007 | Homma et al. |
| 7,167,796 | B2 | 1/2007 | Taylor et al. |
| 7,168,830 | B2 | 1/2007 | Pastrick et al. |
| 7,175,291 | B1 | 2/2007 | Li |
| 7,176,790 | B2 | 2/2007 | Yamazaki |
| 7,184,190 | B2 | 2/2007 | McCabe et al. |
| 7,185,995 | B2 | 3/2007 | Hatanaka et al. |
| 7,187,498 | B2 | 3/2007 | Bengoechea et al. |
| 7,188,963 | B2 | 3/2007 | Schofield et al. |
| 7,193,764 | B2 | 3/2007 | Lin et al. |
| 7,195,381 | B2 | 3/2007 | Lynam et al. |
| 7,199,767 | B2 | 4/2007 | Spero |
| 7,202,987 | B2 | 4/2007 | Varaprasad et al. |
| 7,206,697 | B2 | 4/2007 | Olney et al. |
| 7,209,277 | B2 | 4/2007 | Tonar et al. |
| 7,215,238 | B2 | 5/2007 | Buck et al. |
| 7,215,473 | B2 | 5/2007 | Fleming |
| 7,221,363 | B2 | 5/2007 | Roberts et al. |
| 7,224,324 | B2 | 5/2007 | Quist et al. |
| 7,227,472 | B1 | 6/2007 | Roe |
| 7,230,523 | B2 | 6/2007 | Harter, Jr. et al. |
| 7,232,231 | B2 | 6/2007 | Shih |
| 7,233,304 | B1 | 6/2007 | Aratani et al. |
| 7,235,918 | B2 | 6/2007 | McCullough et al. |
| 7,241,030 | B2 | 7/2007 | Mok et al. |
| 7,241,037 | B2 | 7/2007 | Mathieu et al. |
| 7,245,207 | B1 | 7/2007 | Dayan et al. |
| 7,245,231 | B2 | 7/2007 | Kiefer et al. |
| 7,245,336 | B2 | 7/2007 | Hiyama et al. |
| 7,248,283 | B2 | 7/2007 | Takagi et al. |
| 7,248,305 | B2 | 7/2007 | Ootsuta et al. |
| 7,249,860 | B2 | 7/2007 | Kulas et al. |
| 7,251,079 | B2 | 7/2007 | Capaldo et al. |
| 7,253,723 | B2 | 8/2007 | Lindahl et al. |
| 7,255,451 | B2 | 8/2007 | McCabe et al. |
| 7,255,465 | B2 | 8/2007 | DeLine et al. |
| 7,259,036 | B2 | 8/2007 | Borland et al. |
| 7,262,406 | B2 | 8/2007 | Heslin et al. |
| 7,262,916 | B2 | 8/2007 | Kao et al. |
| 7,265,342 | B2 | 9/2007 | Heslin et al. |
| 7,268,841 | B2 | 9/2007 | Kasajima et al. |
| 7,269,327 | B2 | 9/2007 | Tang |
| 7,269,328 | B2 | 9/2007 | Tang |
| 7,271,951 | B2 | 9/2007 | Weber et al. |
| 7,274,501 | B2 | 9/2007 | McCabe et al. |
| 7,281,491 | B2 | 10/2007 | Iwamaru |
| 7,286,280 | B2 | 10/2007 | Whitehead et al. |
| 7,287,868 | B2 | 10/2007 | Carter et al. |
| 7,289,037 | B2 | 10/2007 | Uken et al. |
| 7,290,919 | B2 | 11/2007 | Pan et al. |
| 7,292,208 | B1 | 11/2007 | Park et al. |
| 7,292,918 | B2 * | 11/2007 | Silvester ......................... 701/29 |
| 7,300,183 | B2 | 11/2007 | Kiyomoto et al. |
| 7,302,344 | B2 | 11/2007 | Olney et al. |
| 7,304,661 | B2 | 12/2007 | Ishikura |
| 7,308,341 | B2 | 12/2007 | Schofield et al. |
| 7,310,177 | B2 | 12/2007 | McCabe et al. |
| 7,311,428 | B2 | 12/2007 | DeLine et al. |
| 7,316,485 | B2 | 1/2008 | Roose |
| 7,317,386 | B2 | 1/2008 | Lengning et al. |
| 7,318,664 | B2 | 1/2008 | Hatanaka et al. |
| 7,323,819 | B2 | 1/2008 | Hong et al. |
| 7,324,043 | B2 | 1/2008 | Purden et al. |
| 7,324,174 | B2 | 1/2008 | Hafuka et al. |
| 7,324,261 | B2 | 1/2008 | Tonar et al. |
| 7,327,225 | B2 | 2/2008 | Nicholas et al. |
| 7,327,226 | B2 | 2/2008 | Turnbull et al. |

| | | |
|---|---|---|
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |

| | | | | | | |
|---|---|---|---|---|---|---|
| 8,019,505 | B2 | 9/2011 | Schofield et al. | DE | 944531 | 7/1956 |
| 2001/0026316 | A1 | 10/2001 | Senatore | DE | 7323996 | 11/1973 |
| 2002/0049535 | A1 | 4/2002 | Rigo et al. | DE | 3248511 A1 | 7/1984 |
| 2002/0085155 | A1 | 7/2002 | Arikawa | DE | 3301945 | 7/1984 |
| 2002/0092958 | A1 | 7/2002 | Lusk | DE | 3614882 | 11/1987 |
| 2002/0118321 | A1 | 8/2002 | Ge | DE | 9306989.8 U1 | 7/1993 |
| 2002/0133144 | A1 | 9/2002 | Chan et al. | DE | 4329983 | 8/1995 |
| 2002/0149727 | A1 | 10/2002 | Wang | DE | 4444443 A1 | 6/1996 |
| 2002/0154007 | A1 | 10/2002 | Yang | DE | 29703084 U1 | 6/1997 |
| 2003/0002165 | A1 | 1/2003 | Mathias et al. | DE | 29805142 U1 | 5/1998 |
| 2003/0007261 | A1 | 1/2003 | Hutzel et al. | DE | 19741896 | 4/1999 |
| 2003/0030724 | A1 | 2/2003 | Okamoto | DE | 19755008 | 7/1999 |
| 2003/0069690 | A1 | 4/2003 | Correia et al. | DE | 29902344 U1 | 7/1999 |
| 2003/0090568 | A1 | 5/2003 | Pico | DE | 19934999 | 2/2001 |
| 2003/0090569 | A1 | 5/2003 | Poechmueller | DE | 19943355 | 3/2001 |
| 2003/0098908 | A1 | 5/2003 | Misaiji et al. | DE | 20118868 | 3/2002 |
| 2003/0103142 | A1 | 6/2003 | Hitomi et al. | DE | 10131459 | 1/2003 |
| 2003/0122929 | A1 | 7/2003 | Minuado et al. | EP | 0299509 A2 | 1/1989 |
| 2003/0133014 | A1 | 7/2003 | Mendoza | EP | 0513476 A1 | 11/1992 |
| 2003/0137586 | A1 | 7/2003 | Lewellen | EP | 0524766 | 1/1993 |
| 2003/0156193 | A1 | 8/2003 | Nakamura | EP | 0729864 A1 | 12/1995 |
| 2003/0169158 | A1 | 9/2003 | Paul, Jr. | EP | 0728618 A2 | 8/1996 |
| 2003/0179293 | A1 | 9/2003 | Oizumi | EP | 0825477 | 2/1998 |
| 2003/0202096 | A1 | 10/2003 | Kim | EP | 0830985 | 3/1998 |
| 2003/0206256 | A1 | 11/2003 | Drain et al. | EP | 0928723 A2 | 7/1999 |
| 2003/0214576 | A1 | 11/2003 | Koga | EP | 937601 A2 | 8/1999 |
| 2003/0214584 | A1 | 11/2003 | Ross, Jr. | EP | 1075986 | 2/2001 |
| 2003/0227546 | A1 | 12/2003 | Hilborn et al. | EP | 1097848 A | 5/2001 |
| 2004/0004541 | A1 | 1/2004 | Hong | EP | 1152285 A2 | 11/2001 |
| 2004/0027695 | A1 | 2/2004 | Lin | EP | 1256833 | 11/2002 |
| 2004/0036768 | A1 | 2/2004 | Green | EP | 0899157 | 10/2004 |
| 2004/0077359 | A1 | 4/2004 | Bernas et al. | EP | 1315639 | 2/2006 |
| 2004/0080404 | A1 | 4/2004 | White | FR | 1021987 A | 2/1953 |
| 2004/0239849 | A1 | 12/2004 | Wang | FR | 1461419 | 12/1966 |
| 2005/0024591 | A1 | 2/2005 | Lian et al. | FR | 2585991 | 2/1987 |
| 2005/0117095 | A1 | 6/2005 | Ma | FR | 2672857 A1 | 8/1992 |
| 2005/0168995 | A1 | 8/2005 | Kittelmann et al. | FR | 2673499 A1 | 9/1992 |
| 2005/0237440 | A1 | 10/2005 | Sugimura et al. | FR | 2759045 | 8/1998 |
| 2005/0270766 | A1 | 12/2005 | Kung et al. | GB | 810010 | 3/1959 |
| 2006/0001641 | A1 | 1/2006 | Degwekar et al. | GB | 934037 | 8/1963 |
| 2006/0050018 | A1 | 3/2006 | Hutzel et al. | GB | 1008411 | 10/1965 |
| 2006/0061008 | A1 | 3/2006 | Karner et al. | GB | 1136134 | 12/1968 |
| 2006/0076860 | A1 | 4/2006 | Hoss | GB | 1553376 | 9/1979 |
| 2006/0139953 | A1 | 6/2006 | Chou et al. | GB | 2137573 A | 10/1984 |
| 2007/0064108 | A1 | 3/2007 | Haler | GB | 2161440 | 1/1986 |
| 2007/0080585 | A1 | 4/2007 | Lyu | GB | 2192370 | 1/1988 |
| 2007/0183037 | A1 | 8/2007 | De Boer et al. | GB | 2222991 | 3/1990 |
| 2007/0262732 | A1 | 11/2007 | Shen | GB | 2255539 A | 11/1992 |
| 2008/0030311 | A1 | 2/2008 | Dayan et al. | GB | 2351055 A | 12/2000 |
| 2008/0068520 | A1 | 3/2008 | Minikey, Jr. et al. | GB | 2362494 | 11/2001 |
| 2008/0180529 | A1 | 7/2008 | Taylor et al. | JP | 50-000638 A | 1/1975 |
| 2008/0231704 | A1 | 9/2008 | Schofield et al. | JP | 52-146988 | 11/1977 |
| 2008/0266389 | A1 | 10/2008 | DeWind et al. | JP | 55-039843 | 3/1980 |
| 2009/0002491 | A1 | 1/2009 | Haler | JP | 57-30639 | 2/1982 |
| 2009/0040778 | A1 | 2/2009 | Takayanagi et al. | JP | 57-208530 | 12/1982 |
| 2009/0052003 | A1 | 2/2009 | Schofield et al. | JP | 58-030729 | 2/1983 |
| 2009/0085729 | A1 | 4/2009 | Nakamura et al. | JP | 58-110334 | 6/1983 |
| 2009/0096937 | A1 | 4/2009 | Bauer et al. | JP | 58-180347 | 10/1983 |
| 2009/0184904 | A1 | 7/2009 | S. et al. | JP | 58-209635 | 12/1983 |
| 2009/0201137 | A1 | 8/2009 | Weller et al. | JP | 59-114139 | 7/1984 |
| 2009/0243824 | A1 | 10/2009 | Hook et al. | JP | 60-212730 | 10/1985 |
| 2009/0262192 | A1 | 10/2009 | Schofield et al. | JP | 60-261275 | 12/1985 |
| 2009/0290369 | A1 | 11/2009 | Schofield et al. | JP | 61-127186 | 6/1986 |
| 2009/0296190 | A1 | 12/2009 | Anderson et al. | JP | 61-260217 | 11/1986 |
| 2010/0045790 | A1 | 2/2010 | Lynam et al. | JP | 62-043543 | 2/1987 |
| 2010/0045899 | A1 | 2/2010 | Ockerse | JP | 62-075619 | 4/1987 |
| 2010/0110523 | A1 | 5/2010 | Varaprasad et al. | JP | 62-122487 | 6/1987 |
| 2010/0110553 | A1 | 5/2010 | Anderson et al. | JP | 63-02753 | 1/1988 |
| 2010/0194890 | A1 | 8/2010 | Weller et al. | JP | 63-106730 | 5/1988 |
| 2010/0195226 | A1 | 8/2010 | Heslin et al. | JP | 63-106731 | 5/1988 |
| 2010/0201896 | A1 | 8/2010 | Ostreko et al. | JP | 63-274286 | 11/1988 |
| 2010/0245701 | A1 | 9/2010 | Sato et al. | JP | 64-14700 | 1/1989 |
| 2010/0246017 | A1 | 9/2010 | Tonar et al. | JP | 01-123587 | 5/1989 |
| 2010/0277786 | A1 | 11/2010 | Anderson et al. | JP | 02-122844 | 10/1990 |
| 2011/0141543 | A1 | 6/2011 | Uken et al. | JP | 03-28947 | 3/1991 |
| | | | | JP | 03-052097 | 3/1991 |
| FOREIGN PATENT DOCUMENTS | | | | JP | 30-061192 | 3/1991 |
| CN | 1189224 | | 7/1998 | JP | 03-110855 | 5/1991 |
| DE | 941408 | | 4/1956 | JP | 03-243914 | 10/1991 |

| | | |
|---|---|---|
| JP | 04-114587 | 4/1992 |
| JP | 04-245886 | 9/1992 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-175035 | 7/1995 |
| JP | 07-266928 | 10/1995 |
| JP | 07-277072 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 05-077657 | 7/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

N.R. Lynam, "Electrochromic Automotive Day/Night Mirror," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

* cited by examiner

VEHICLE INFORMATION DISPLAY

CROSS REFERENCE TO RELATED APPLICATIONS

The present application is a continuation of U.S. patent application Ser. No. 13/006,905, filed Jan. 14, 2011, now U.S. Pat. No. 8,019,505, which is a continuation of U.S. patent application Ser. No. 12/776,787, filed May 10, 2010, now U.S. Pat. No. 7,873,593, which is a continuation of U.S. patent application Ser. No. 12/428,571, filed Apr. 23, 2009, now U.S. Pat. No. 7,734,392, which is a continuation of U.S. patent application Ser, No. 11/953,362, filed Dec. 10, 2007, now U.S. Pat. No. 7,526,367, which is a continuation of U.S. patent application Ser. No. 10/964,512, filed Oct. 13, 2004, now U.S. Pat. No. 7,308,341, which claims the benefit of U.S. provisional application Ser. No. 60/511,231, filed Oct. 14, 2003, which are hereby incorporated herein by reference in their entireties.

FIELD OF THE INVENTION

The present invention relates generally to communication or telematics systems for vehicles and, more particularly, to a communication or telematics system for a vehicle that has an interior assembly, such as an interior rearview mirror assembly or accessory module or windshield electronic module or the like, and a human-machine interface, such as user actuatable buttons or a microphone or the like, at or in the interior assembly and connected to a telematics control unit that is in the vehicle and remote from the mirror assembly.

BACKGROUND OF THE INVENTION

It is known to provide an interior rearview mirror assembly that includes a vehicle information display, such as a directional heading display or compass display, such as the types disclosed in U.S. Pat. No. 5,802,727, which is hereby incorporated herein by reference. Typically, such a mirror assembly includes a compass sensor, such as a magnetoresistive sensor, a magnetocapacitive sensor, a magnetoinductive sensor, or a flux gate sensor or the like, which may be fixedly attached to a mirror mount that attaches the mirror assembly to a mirror assembly mounting element, such as a conventional mounting button mounted on an interior surface of the windshield of the vehicle. The mirror assembly may also include compass processing circuitry that is operable to process the signals from the sensors and to control or adjust the display to provide directional heading information to the driver or occupant of the vehicle.

It is also known to provide a telematics system, such as ONSTAR® or the like, as a vehicle feature or option or accessory. The telematics system includes a telematics electronics control unit or module that may be positioned at an instrument panel area of the vehicle or elsewhere in the vehicle and typically remote from the interior rearview mirror assembly. The telematics control module may include a global positioning system (GPS) control or unit or receiver and a cellular telephone receiver and/or the like.

The interior rearview mirror assembly in many vehicles provides a human-machine interface (HMI), such as buttons or the like and/or a microphone for interfacing with the telematics control module, such as disclosed in U.S. Pat. No. 6,445,287 for TIRE INFLATION ASSISTANCE MONITORING SYSTEM, which is hereby incorporated herein by reference. The mirror assembly thus may include user actuatable inputs or buttons or controls, such as at a bezel or chin portion of the mirror assembly that are readily accessible for actuation by an occupant of the vehicle, and/or may include a microphone for receiving audible signals from within the cabin of the vehicle. The user actuatable buttons and the microphone at the interior rearview mirror assembly are typically connected to or in communication with the telematics control module. For example, a keypad status of the user actuatable buttons or keypad is typically communicated to the telematics control module via a two wire connective or communication link between the mirror assembly and the telematics control module, with the status identification being achieved via a variable resistance keypad at the buttons. The microphone is also typically connected to the telematics control module via a separate two wire connection.

It is also known in the art (such as disclosed in U.S. Pat. Nos. 6,539,306; 5,724,316; and 5,761,094, which are hereby incorporated herein by reference) to utilize the global positioning system as a means of or adjunct to directional sensing for the vehicle. The GPS control unit may optionally be connected to or in communication with the compass sensor/system/display via a separate connective wiring or communication link. The wiring thus typically is separately provided for vehicles that will include such a GPS-derived directional sensing system.

Therefore, there is a need in the art for a vehicle communication or telematics system, which has a human-machine interface or accessory associated with an in-vehicle telematics control module and located at an interior assembly that is remote from the in-vehicle telematics control module, and which overcomes the shortcomings of the prior art.

SUMMARY OF THE INVENTION

The present invention provides a communication system that utilizes a common connective link or wire to provide different signals or data between a communication control (such as an in-vehicle telematics control unit or the like) in the vehicle and an interior assembly remote from the communication control. The communication system utilizes the existing connective link between a human-machine interface or accessory or device (such as user actuatable inputs or buttons or a microphone or the like at the interior rearview mirror assembly) and the in-vehicle communication control for either (a) communicating a signal from a vehicle-based or in-vehicle navigational system or control, such as an in-vehicle global positioning system control unit (which may be part of or incorporated into the telematics control unit) to the interior assembly (such as to a directional heading display or compass display system at the interior assembly), or (b) communicating a signal from a mirror-based or accessory module-based navigational system, such as a global positioning system control unit (which may be located at or near the interior rearview mirror assembly or at or near an accessory module or windshield electronic module or the like at or near or associated with the interior rearview mirror assembly and/or the vehicle windshield) to the in-vehicle communication control.

The global positioning system control of the communication system of the present invention may comprise a vehicle-based or telematics-based or in-vehicle GPS control unit (that may be at or near or associated with or part of the in-vehicle telematics control unit) positioned at an instrument panel of the vehicle or elsewhere in the vehicle and at a location remote from the interior assembly. The in-vehicle GPS control unit may access the connective link or pathway and may utilize the link or pathway to communicate GPS-derived signals or data to the interior assembly, such as to a directional heading display (or to a compass system or circuitry) at or near or associated with the interior assembly. For example, the in-vehicle GPS control unit may utilize aspects described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, to provide directional heading data or signals to the directional heading display.

Optionally, the global positioning system control unit of the communication system of the present invention may be positioned at or near the interior assembly, such as within the mirror assembly or at or in an accessory module or pod or attachment or windshield electronic module or the like that is at or near or attached to or associated with the interior rearview mirror assembly. The GPS control unit may access and utilize the existing connective link or pathway or wires to communicate GPS-derived signals or data (such as vehicle location or position or directional heading data and/or time data and/or the like) to the communication control located in the vehicle and remote from the interior assembly.

According to an aspect of the present invention, a vehicle communication system includes an interior assembly having a human-machine interface or accessory or device that is associated with a vehicle-based or in-vehicle communication control module or unit positioned remote from the interior assembly. The human-machine interface is connected to the in-vehicle communication control unit or module via a connective or communication pathway or link, such as a pair of wires or the like. The connective link communicates at least one human-machine interface (HMI) signal from the human-machine interface to the communication control. The communication system includes or may be associated with or in communication with a global positioning system control at or near or associated with or incorporated into the in-vehicle communication control. The global positioning system control may utilize the connective pathway or link to communicate at least one GPS-derived signal or GPS data to the interior assembly of the communication system, such as to an accessory or display or device at or in or associated with the interior assembly. The HMI signals and the GPS-derived signals share the connective link and are communicated via a common connective link between the in-vehicle communication control and the interior assembly.

For example, the interior assembly may include a directional heading display system that is operable to display information indicative of a directional heading of the vehicle to a driver or occupant of the vehicle. The GPS control may share the common connective link to communicate the GPS-derived signals or data to the directional heading display system of the interior assembly. The interior assembly may comprise an interior rearview mirror assembly of the vehicle, an accessory module of the vehicle, a windshield electronics module of the vehicle, an overhead console of the vehicle, or an extension of a console that may be positioned along the windshield of the vehicle (such as an extension of the types described in U.S. Pat. No. 6,445,287 for TIRE INFLATION ASSISTANCE MONITORING SYSTEM, which is hereby incorporated herein by reference.

According to another aspect of the present invention, a vehicle communication system includes an interior assembly having a human-machine interface or accessory or device associated with a vehicle-based or in-vehicle communication control module or unit positioned remote from the interior assembly. The human-machine interface is connected to the communication control unit or module via a connective or communication pathway or link, such as a pair of wires or the like, and communicates at least one human-machine interface (HMI) signal to the communication control via the connective link. The communication system includes a global positioning system control located at the interior assembly (such as at an interior rearview mirror assembly or at an accessory module or pod or attachment or windshield electronic module at or near or attached to or associated with an interior rearview mirror assembly). The global positioning system control utilizes the common connective pathway or link to communicate GPS-derived signals or data to the in-vehicle communication control. The GPS-derived signals and the HMI signals share the connective link and are communicated via a common connective link between the in-vehicle communication control and the interior assembly.

Optionally, the human-machine interface may comprise a plurality of user actuatable inputs or controls or buttons that are readily accessible by an occupant of the vehicle and operable to toggle or actuate/deactuate one or more functions of the communication control. Optionally, the human-machine interface may comprise other accessories or devices or interfaces associated with or in communication with the communication control (or with a cellular telephone receiver or the like associated with or incorporated into the communication control), such as a microphone or microphones or microphone array located at or in or near the interior assembly or associated with the interior assembly or the like, without affecting the scope of the present invention.

Therefore, the present invention provides a vehicle communication system that includes an interior assembly having a human-machine interface (such as user actuatable inputs or buttons or a microphone or the like) that is connected to or in communication with an in-vehicle communication control (such as an in-vehicle telematics control unit or the like) positioned or located remote from the interior assembly. The GPS control may utilize the existing wires or connective links or pathways that are connected between the human-machine interface and the in-vehicle communication control to communicate GPS-derived signals or data to an accessory or display at the interior assembly (if the GPS control unit is a telematics-based or in-vehicle GPS control unit and is located at or is part of the telematics control unit and is thus remote from the interior assembly), or to the in-vehicle communication control (if the GPS control unit is located at or near or is otherwise associated with the interior assembly and is thus remote from the in-vehicle communication control). The same or common existing wires or connective link thus may be used to communicate HMI signals to the communication control (such as to toggle or actuate/deactuate a function of a telematics control unit or to provide a signal indicative of an audible signal within the vehicle as received by a microphone or the like) and to communicate GPS-derived signals or data either to an accessory or display system in or at or near the interior assembly or to the in-vehicle communication control.

The present invention thus may provide an in-vehicle GPS control unit and an accessory (such as a directional heading display or compass system or the like) at an interior assembly that utilize existing wires or links or pathways between the interior assembly and the in-vehicle telematics control unit of the vehicle. The communication system of the present invention thus does not require separate wires or communication links or pathways between the GPS control unit (which may be positioned remote from the interior assembly) and the accessory or display at the interior assembly. The present invention thus may reduce the costs associated with providing GPS-derived signals or data to a compass or directional heading display or system of a mirror assembly by utilizing and sharing common and existing wiring for the additional feature.

Alternately, the present invention may provide a GPS control unit at or near the interior assembly that may utilize the existing links or pathways or wires to communicate GPS-derived signals or data (such as location or position data or directional heading data or time data and/or the like) to the in-vehicle communication or telematics module located in the vehicle and remote from the interior assembly. The present invention thus may provide an enhanced performance GPS control unit (by placing the GPS control unit and GPS antenna at the interior assembly, such as at an interior rearview mirror assembly or at or in an accessory module or pod or attachment or windshield electronic module at or near or associated with the interior rearview mirror assembly and/or the windshield or at or in an overhead console or an extension of a console at or near the windshield), without requiring additional wiring changes to the vehicle.

The present invention thus provides a common connective or communication link between the human-machine interface and communication control and between the GPS control unit and accessory or directional heading display or communication control. The present invention thus provides for communication of signals or data without requiring additional communication links or wires, and thus limits or substantially precludes any disturbance of the current or existing vehicle wiring or architecture of the vehicle. The present invention thus may provide GPS-based or GPS-derived features at a reduced cost for vehicles that already include a vehicle-based or in-vehicle communication or telematics control or module or unit with interface buttons or microphones (or other human-machine interfaces) at the interior assembly (such as at the interior rearview mirror assembly or at an accessory module or pod or windshield electronics module or the like at or near or associated with the mirror assembly or at or in an overhead console or an extension of a console) and remote from the in-vehicle communication control.

These and other objects, advantages, purposes and features of the present invention will become apparent upon review of the following specification in conjunction with the drawings.

DESCRIPTION OF THE PREFERRED EMBODIMENTS

Figure 1:
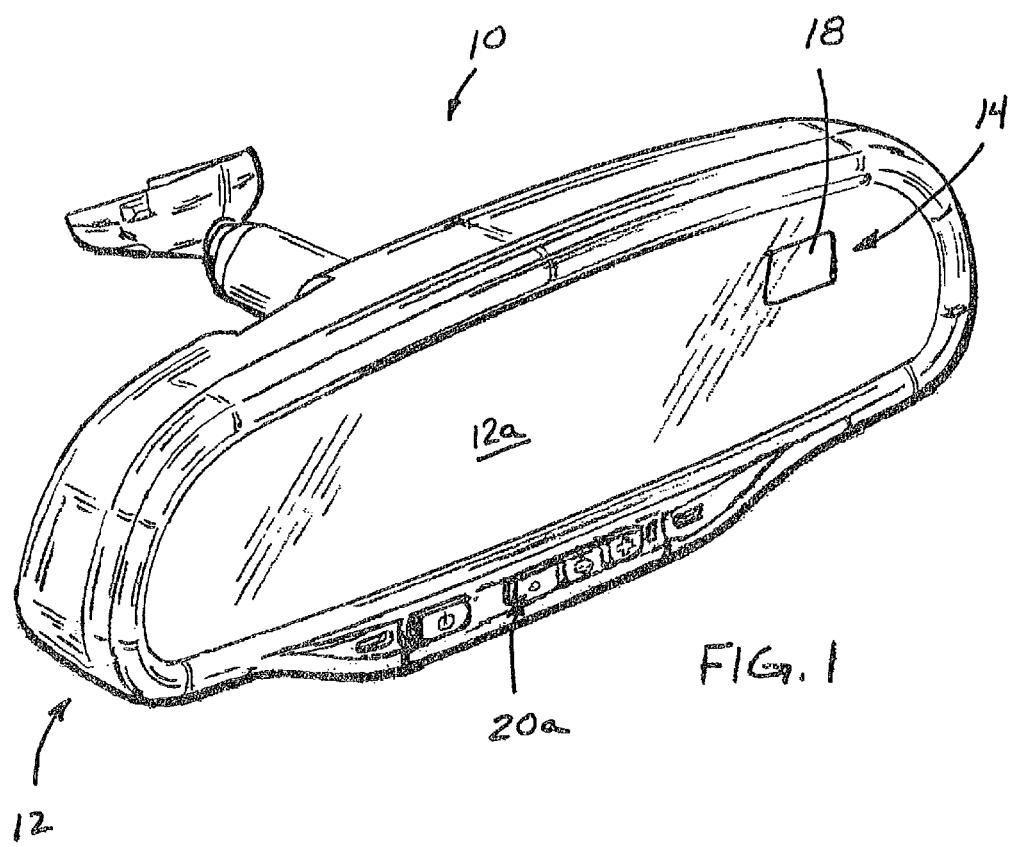
FIG. 1 is a forward facing perspective view of an interior rearview mirror assembly in accordance with the present invention, as facing generally forward with respect to a direction of travel of a vehicle.

Referring now to the drawings and the illustrative embodiments depicted therein, a communication system 10 (FIGS. 1 and 2) of a vehicle includes an interior assembly 12, an accessory or device or display system 14 positioned at or near or within the interior assembly 12, and a vehicle-based or in-vehicle communication or telematics system electronic control module or unit or circuitry 16 positioned in the vehicle and remote from the interior assembly, such as within an instrument panel area 17 of the vehicle or elsewhere in the vehicle (such as in or at or near a vehicle console or the like).

The accessory 14 may comprise a directional heading display system and may include a directional heading display or display element 18 that is operable to display directional information that is viewable at the interior assembly by a driver or occupant of the vehicle. The interior assembly 12 includes a human-machine interface (HMI) or telematics accessory or device 20 (such as one or more user actuatable inputs or buttons or controls 20a for controlling or toggling or actuating/deactuating various functions of the communication system, or such as a microphone 20b for receiving audible signals from within the vehicle cabin, or the like) for providing a user interface with the in-vehicle telematics control module 16. The human-machine interface 20 is connected to or in communication with the telematics control module 16 via wires or a connective or communication pathway or link 22. The telematics control module 16 may include or may be associated with a vehicle navigational system or unit, such as a global positioning system (GPS) control or circuitry or module or unit 28 (FIG. 2) or 28' (FIG. 3) that may access and utilize or share common wires or communication links 22 to communicate data or signals to the interior assembly 12, such as to the accessory or display or system 14 at the interior assembly 12, and/or to the telematics control module 16, as discussed below (with the link 22 being commonly used by the human-machine interface (HMI) signals between the human-machine interface 20 and telematics control module 16 and by the GPS-derived signals or data from the GPS control unit 28, 28').

The communication system of the present invention thus provides for communication between the global positioning system control unit and the compass or directional heading display system (or other accessory or system at the interior assembly that is associated with the global positioning system control unit) or communication or telematics control module via utilization of existing wires or leads or links or pathways between the telematics control module and the interior assembly, such that an addition of such a GPS feature or function results in little or no disturbance of or adverse affect on the current vehicle wiring and/or architecture.

The communication system may utilize aspects of various communication or telematics systems, such as an ONSTAR® system as found in General Motors vehicles or the like, and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; and/or 6,678,614; and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/422,378, filed Apr. 24, 2003 by Schofield for IMAGING SYSTEM FOR VEHICLE, now U.S. Pat. No. 6,946,978; and Ser. No. 10/933,842, filed Sep. 3, 2004 by Kulas et al. for INTERIOR REARVIEW MIRROR ASSEMBLY, now U.S. Pat. No. 7,249,860; and/or PCT Application No. PCT/US03/40611, filed Dec. 19, 2003 by Donnelly Corporation et al. for ACCESSORY SYSTEM FOR VEHICLE, and published Jul. 15, 2004 as International Publication No. WO 2004/058540, and/or PCT Application No. PCT/US03/308877, filed Oct. 1, 2003 by Donnelly Corp. for MICROPHONE SYSTEM FOR VEHICLE, and published Apr. 15, 2004 as International Publication No. WO 2004/032568, which are all hereby incorporated herein by reference.

Optionally, and as discussed in detail below, the GPS control unit may comprise an in-vehicle or telematics-based GPS control unit 28 (FIG. 2), which is remote from the interior assembly (and may be provided as part of the telematics control module 16 or may be associated with or in communication with the telematics control module 16, without affecting the scope of the present invention). The GPS control unit 28 may access or utilize or share the connective or communication link or pathway or wires 22 to communicate GPS-derived data or signals, such as location or position data or directional heading data and/or time data and the like, to the compass or directional heading display system at or near or associated with the interior assembly. Optionally, and as also discussed below, the GPS control unit may comprise a mirror-based or module-based or assembly-based GPS control unit 28' (FIG. 3) and may be positioned in or at or near the interior assembly 12, whereby the GPS control unit 28' may access or utilize or share the connective or communication link or pathway or wires 22 to communicate GPS-derived data or signals, such as location or position data or directional heading data and/or time data and the like, to the in-vehicle telematics system module 16 located remote from the interior assembly 12.

The interior assembly 12 may comprise an interior rearview mirror assembly (as shown in FIG. 1), or may comprise another type of interior assembly, such as an accessory module or pod or attachment located at or near or attached to or associated with an interior rearview mirror assembly, or such as a windshield electronic module or windshield integration module or the like positioned at or near the windshield of the vehicle. The windshield electronic module or attachment may include other accessories or components and may utilize aspects of accessory modules such as of the types disclosed in commonly assigned U.S. Pat. Nos. 6,690,268; 6,243,003; 6,278,377; 6,420,975; U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 10/355,454, filed Jan. 31, 2002 by Schofield et al. for VEHICLE ACCESSORY MODULE, now U.S. Pat. No. 6,824,281; and/or PCT Application No. PCT/US03/40611, filed Dec. 19, 2003 by Donnelly Corp. et al. for ACCESSORY SYSTEM FOR VEHICLE, published on Jul. 15, 2004 as International Pub. No. WO 2004/058540 A2, and published Jul. 15, 2004 as International Publication No. WO 2004/058540; and/or PCT Application No. PCT/US01/06067, filed Feb. 26, 2001, International Publication No. WO 01/64481, published Sep. 7, 2001, which are all hereby incorporated herein by reference. The windshield electronic module may be positioned at or near or attached to or associated with or adjacent to the windshield of the vehicle such that at least a portion of the windshield electronic module is positioned at the windshield. The windshield electronic module may attach to the windshield, and may have a view toward the windshield, or may be an extension of a header console or the like, such as a windshield module of the types disclosed in U.S. Pat. No. 6,445,287; and in U.S. patent application Ser. No. 10/232,122, filed Aug. 30, 2002 by Schofield et al. for VEHICULAR HEADER CONSOLE SYSTEM, now U.S. Pat. No. 6,975,215, which are hereby incorporated herein by reference. Such windshield electronic modules may be separate and distinct from an interior rearview mirror assembly. Optionally, the interior assembly may comprise an overhead accessory console of the vehicle that is at or near or attached to or associated with a roof of a vehicle. Other types of interior assemblies may be implemented, without affecting the scope of the present invention.

The global positioning system control unit 28, 28' may comprise a GPS receiver/signal processor that is connected to a GPS antenna 30, 30' that receives a satellite communication to determine the geographic location of the vehicle, as is known in the art. Such global positioning system receivers/processors, sometimes referred to as a GPS chip set, are available from various suppliers, such as, for example, Motorola of Schaumburg, Ill. and Trimble Navigation of Sunnyvale, Calif. By deduction of the point-to-point locational movement of the vehicle, the directional heading (e.g., N, S, E, W, etc., which may be displayed as characters, icons, indicial or other indicators or the like) of the vehicle can be deduced by the GPS control unit.

The human-machine interface or accessory or device 20 may comprise one or more user actuatable inputs 20a. The user actuatable inputs 20a (such as buttons, switches or the like) may be positioned at and associated with a keypad 24 that is connected to the telematics control module 16 of the vehicle via wires or link or pathway 22a. For example, one of a pair of wires may provide an initial voltage to the keypad 24, while the other wire or return wire may provide a return voltage or signal to the telematics control module 16. The keypad 24 may include a voltage divider comprising a plurality of resistors to drop the voltage down or reduce the voltage in response to one of the inputs or buttons 20a being actuated or depressed by a user. For example, each button may be associated with a respective resistor, whereby actuation of one of the buttons causes a respective drop in voltage (via the respective resistor) such that the return voltage (along the other or return wire of wire or link 22a) to the telematics control module 16 indicates which button was actuated. The keypad or resistive ladder interface thus provides multiple voltage conditions (for example, four voltage conditions for three inputs or buttons) for the various conditions (no button actuated or one of the three buttons actuated) that may be encountered via actuation of the user inputs or buttons at the interior assembly.

Alternately, the communication or telematics control module 16 may also or otherwise be connected to another human-machine interface or accessory or device, such as microphone 20b (which may be positioned at or in or near the interior rearview mirror assembly or at or in or near an accessory module or pod or windshield electronics module at or near or associated with or attached to the interior rearview mirror assembly or at an overhead console or the like) via wires or connective or communication link or pathway 22b. The microphone may be any type of microphone or microphones or microphone array suitable for use with the telematics system or telematics control module, and may utilize aspects of the microphones described in U.S. Pat. Nos. 6,243,003; 6,278,377; and 6,420,975; and PCT Application No. US/2003/030877, filed Oct. 1, 2003 by Donnelly Corporation et al. for MICROPHONE SYSTEM FOR VEHICLE, now published as PCT Pub. No. WO 2004/032568 A1, which are hereby incorporated herein by reference.

Figure 2:
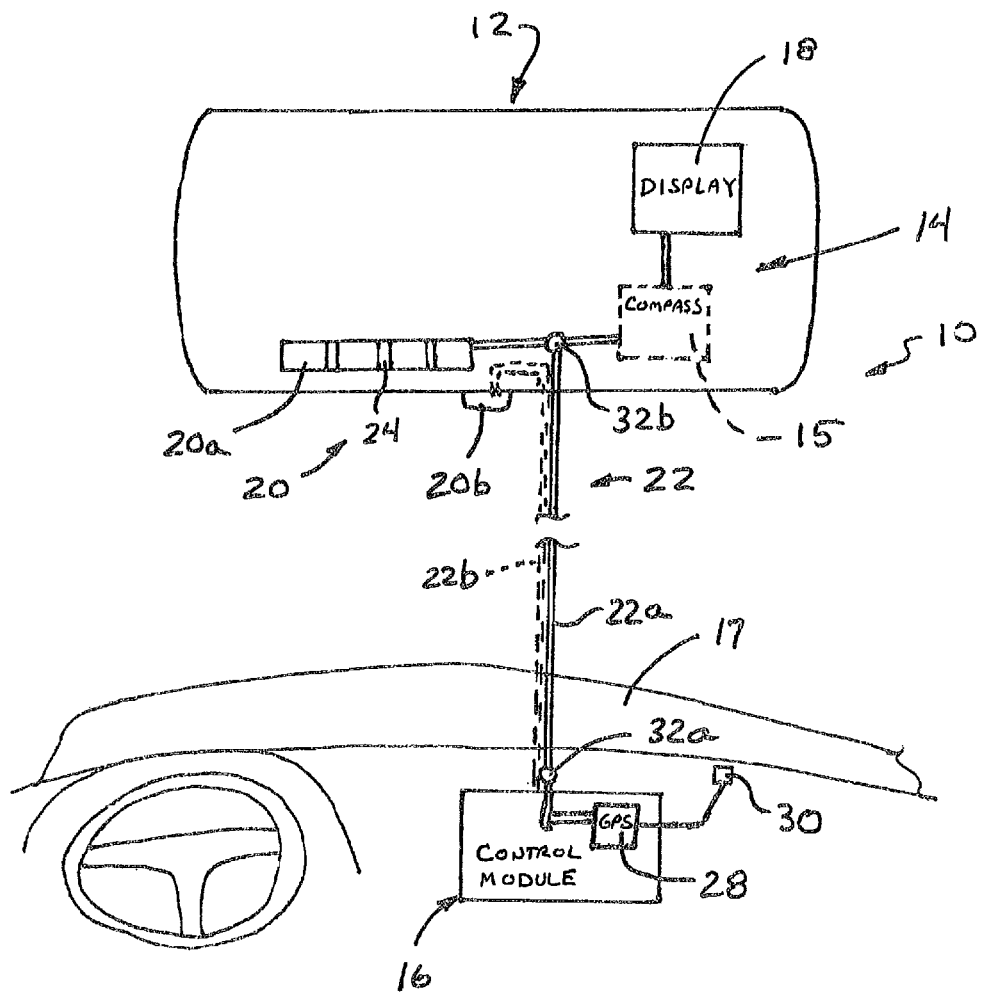
FIG. 2 is a block diagram of a communication system in accordance with the present invention.

Optionally, and as shown FIG. 2, a vehicle-based or telematics-based or in-vehicle GPS control unit 28 may be positioned at or near or may be incorporated in the in-vehicle telematics module 16, such as at the instrument panel area 17 of the vehicle or at a console of the vehicle or the like. The GPS control unit 28 may be connected to or may be in communication with the common link or pathway 22 and may utilize the existing link or pathway 22 to communicate GPS-derived signals or data to the interior assembly 12, such as to an accessory or device or display, such as a directional heading display system 14 and/or directional heading display element 18 at the interior rearview mirror assembly or the like, in order to provide directional heading data and/or position data to the directional heading display system, such as by utilizing the principles described in U.S. patent application Ser. No.

10/456,599, filed Jun. 6, 2003 by Weller et al. for INTERIOR REARVIEW MIRROR SYSTEM WITH COMPASS, now U.S. Pat. No. 7,004,593; and/or Ser. No. 10/933,842, filed Sep. 3, 2004 by Kulas et al. for INTERIOR REARVIEW MIRROR ASSEMBLY, now U.S. Pat. No. 7,249,860; and/or PCT Application No. PCT/US2004/015424, filed May 18, 2004 by Donnelly Corp. et al. for MIRROR ASSEMBLY FOR VEHICLE, and published Dec. 2, 2004 as International Publication No. WO 2004/103772, which are hereby incorporated herein by reference. Optionally, as described below, the GPS control unit 28 may communicate such GPS-derived data or signals to a compass sensor or system or circuitry 15 or to the directional heading display 18 in applications that do not include the magnetoresponsive compass sensor system, without affecting the scope of the present invention. Optionally, the GPS control unit 28 may communicate such GPS-derived data or signals to other GPS-based accessories or systems at the interior assembly or other accessories or systems that are positioned or located at the interior assembly and are suitable to receive such GPS-derived data or signals, without affecting the scope of the present invention. The common connective link 22 thus may communicate HMI signals down the link to the telematics control unit or module while also providing a conduit or link for communicating GPS-derived signals or data up the link to the interior assembly.

Optionally, the communication system of the present invention may be incorporated into a vehicle that includes a network bus, such as a CAN bus or a LIN bus or the like, such as disclosed in U.S. Pat. No. 6,291,905, which is hereby incorporated herein by reference. The common connective link 22 may connect at or convert to the LIN bus (or CAN bus, such as a dedicated CAN bus or the like, or other interface connection or the like), such that a LIN bus node 32a is at or near the vehicle-based telematics control module 16 at the instrument panel or console or the like and a LIN bus node 32b is at or near the interior assembly or mirror assembly or accessory module or the like. The bus nodes 32a, 32b and link 22 thus may transfer GPS-derived data or signals from the GPS control unit 28 to the accessory or display system 14, while the nodes and link may provide the voltage supply and return signals or HMI signals to and from the keypad 24 or other human-machine interface or telematics accessory or device at or near or associated with the interior assembly. The communication system of the present invention thus may utilize the same or common wires or link or pathway to provide or communicate HMI signals to the telematics control module from user inputs or a microphone or the like at the interior assembly and to provide or communicate GPS-derived data or signals to the accessory or display system (such as a directional heading display or the like) at or in the interior assembly from the GPS control unit at the telematics control module or otherwise remote from the interior assembly.

Figure 3:
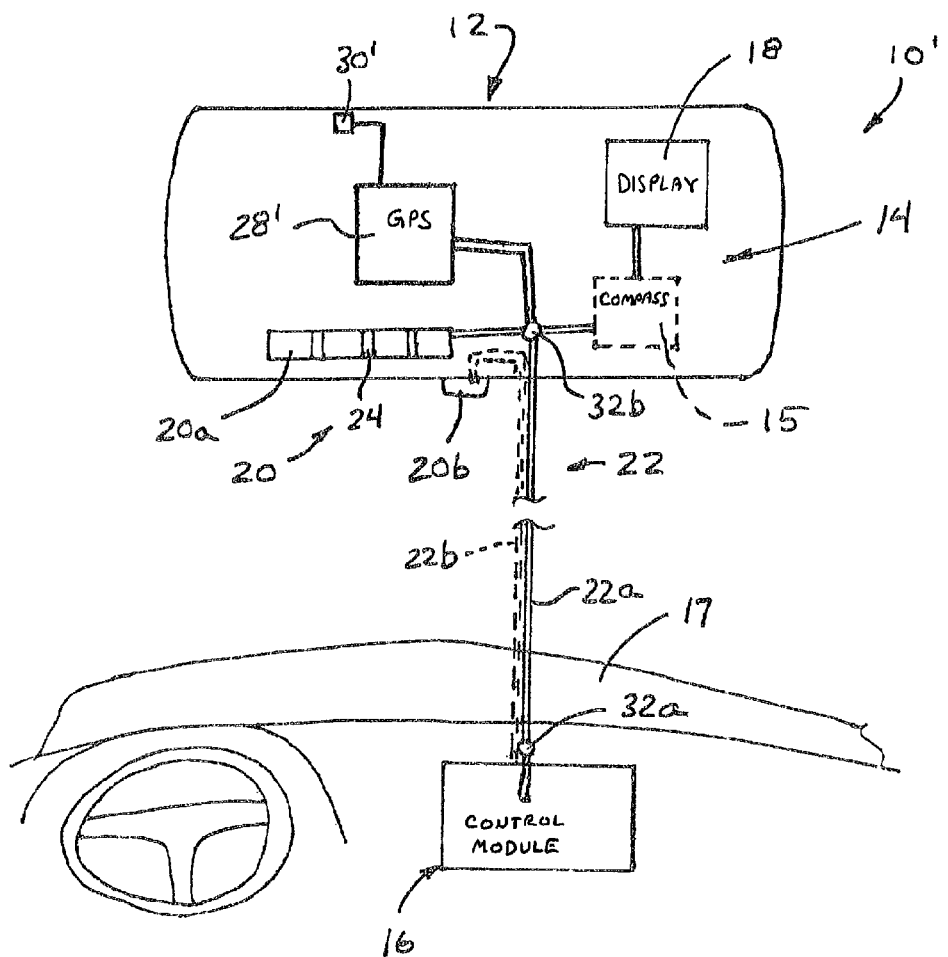
FIG. 3 is a block diagram similar to FIG. 2 of another communication system in accordance with the present invention.

The network bus may be operable to communicate with other systems of the vehicle, such as with accessories or elements of an accessory module, such as an accessory module of the type disclosed in commonly assigned U.S. Pat. Nos. 6,690,268; 6,243,003; 6,278,377 and 6,420,975; U.S. patent application Ser. No. 10/054,633, filed Jan. 22, 2002 by Lynam et al. for VEHICULAR LIGHTING SYSTEM, now U.S. Pat. No. 7,195,381; U.S. patent application Ser. No. 10/355,454, filed Jan. 31, 2003 by Schofield et al. for VEHICLE ACCESSORY MODULE, now U.S. Pat. No. 6,824,281; and/or International Publication No. WO 01/64481, published Sep. 7, 2001, which are all hereby incorporated herein by reference. Optionally, the GPS control unit and telematics control module and the accessories or components of the interior assembly or mirror assembly or accessory or electronic module or the like may be connected to the vehicle electronic or communication systems and may be connected via other various protocols or nodes, such as Bluetooth, SCP, UBP, J1850, CAN J2284, Fire Wire 1394, MOST and/or the like, depending on the particular application of the communication system of the present invention Optionally, and as shown in FIG. 3, a communication system 10' may comprise a GPS control unit 28' and a GPS antenna 30', which may be positioned at or in or near the interior assembly 12, such as at or in or near the interior rearview mirror assembly or at or in an accessory module or attachment or windshield electronic module at or near or attached to or associated with an interior rearview mirror assembly or the windshield of the vehicle, an overhead accessory console of the vehicle at or near or attached to or associated with a roof of a vehicle, or an extension of a console of the vehicle or the like. The GPS control unit 28' may be connected to or in communication with the connective or communication link or pathway or wires 22 and may utilize the common connective link 22 to communicate a GPS-derived signal or data to the vehicle-based telematics control module 16' (which may not include a GPS control unit or circuitry or receiver), in order to provide location data or other GPS-derived data to the telematics control module. The GPS control unit 28' may also communicate with the accessory or display system 14 at or near or associated with the interior assembly 12, as discussed above.

As also discussed above, the common connective link 22 may connect at or convert to a LIN bus or the like at the keypad 24 at the interior assembly or mirror assembly or accessory module or the like and at the telematics control module 16. The bus or nodes 32a, 32b and link 22 thus may transfer data from the GPS control unit 28' to the vehicle-based telematics control module 16, while the nodes and link may provide the voltage supply and return signals to and from the keypad 24 (or other HMI signals from a microphone or other human-machine interface or telematics accessory or device at or near or associated with the interior assembly). The communication system of the present invention thus may utilize the same or common wires or link or pathway to communicate HMI signals to provide control of the telematics control module via user inputs at the interior assembly and to communicate GPS-derived data or signals to the vehicle-based telematics control module from the GPS control unit at or near or associated with the interior assembly.

Optionally, the GPS-derived data or signals communicated from the GPS control unit 28, 28' may be superimposed on the common link or pathway 22, such as via superimposing data or signals associated with or indicative of the GPS position or location or directional heading information on top of the voltage conditions associated with the keypad, such as via modulation or coding of the signals on the common wires or link (whereby the LIN bus nodes or the like may not be necessary), without affecting the scope of the present invention. Optionally, other existing wires or communication or connective links or pathways, such as wires or links between the telematics control module and a microphone (such as a microphone at the mirror assembly or accessory module at or near or associated with the mirror assembly) or the like, may be utilized or shared by the telematics control module and the global positioning system control unit, such as in a similar manner as described above. The common connective wires or links or pathways thus may be shared by the telematics control module and the GPS control unit to provide the desired or appropriate voltage or signal or data to the appropriate accessory or device or system or display, without requiring separate wires or communication links or pathways between the modules, units and/or systems of the communication system of the present invention.

Interior assembly 12 may include or may be associated with a compass or directional heading display system 14, which includes the directional heading display 18. The directional heading display system 14 may include or comprise compass sensors and circuitry 15, which function to detect a directional heading of the vehicle relative to the earth's magnetic field, as is known in the art. The compass sensor may be any known sensor type, such as a magnetoresistive sensor (such as described in U.S. Pat. Nos. 5,802,727 and 6,513,252, which are hereby incorporated herein by reference), a magnetocapacitive sensor, a magnetoinductive sensor, or a fluxgate sensor or the like, without affecting the scope of the present invention. The compass sensor may include a pair of sensors positioned generally orthogonal to one another. The generally orthogonal sensors are preferably oriented relative to the vehicle such that one of the sensors is generally parallel to the floor of the vehicle and pointing generally forwardly in the direction of travel of the vehicle, while the other is generally orthogonal or perpendicular to the first sensor. The compass sensor or sensors provide an output signal to the compass processing circuitry, which is operable to process the output signal to determine the vehicle heading and to actuate or control or adjust an output of directional heading display 18 in response to the output signal.

The compass sensors and/or circuitry 15 may be located on a printed circuit board (PCB) that may be mounted or positioned or bonded along the rear surface of the mirror reflective element 12a (FIG. 1) of the interior rearview mirror assembly. Optionally, the compass system and circuit board and circuitry may be positioned elsewhere in or at the mirror assembly or in or at an accessory module or compass module or pod or windshield electronic module associated with or positioned near or at or attached to the interior rearview mirror assembly (such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference), without affecting the scope of the present invention. Optionally, the circuitry may be located or applied or printed directly on the reflective element, such as in the manner described in U.S. patent application Ser. No. 10/956,749, filed Oct. 1, 2004 by Schofield for MIRROR REFLECTIVE ELEMENT ASSEMBLY INCLUDING ELECTRONIC COMPONENT, now U.S. Pat. No. 7,446,924, which is hereby incorporated herein by reference. The printed circuit board or reflective element assembly may include all of the processing circuitry and the compass sensor. Such processing circuitry may include compensation methods known in the art, such as described in U.S. Pat. Nos. 4,546,551; 5,699,044; 4,953,305; 5,576,687; 5,632,092; 5,644,851; 5,708,410; 5,737,226; 5,802,727; 5,878,370; 6,087,953; 6,173,501; and 6,222,460, and U.S. patent application Ser. No. 09/999,429, filed Nov. 15, 2001 by DeLine et al. for INTERIOR REARVIEW MIRROR SYSTEM INCORPORATING A DIRECTIONAL INFORMATION DISPLAY, now U.S. Pat. No. 6,642,851, and European patent application, published Oct. 11, 2000 under Publication No. EP 0 1043566, which are all hereby incorporated herein by reference.

Optionally, the compass circuitry or sensors may be attached to or positioned at the reflective element of the mirror assembly and thus may be movable with the reflective element when a user adjusts the mirror assembly to provide the desired rearward viewing. It is envisioned that such sensors or circuitry may be positioned at the reflective element of a memory mirror system, such that the movement of the reflective element may be tracked by the system and the orientation of the sensors thus may be known to the system. The system may determine the orientation of the sensors and/or mirror assembly and thus may calculate or compensate for the change to the orientation or azimuth of the compass sensors to determine the correct vehicle heading. The system may be initially set up with an initial setting that corresponds to an initial position or orientation of the compass sensors, and then adjustment of the reflective element by the adjustment mechanism of the memory system may be tracked and/or determined as the mirror assembly is adjusted. Such an application is particularly suitable for memory mirror systems, particularly where the reflective element is movable relative to a fixed housing or casing or the like.

The GPS control unit 28, 28' may be operable to provide GPS-derived directional heading information that is auxiliary to the compass system sensors and circuitry (so that the GPS control unit may assist in providing GPS-derived directional heading data or information at the directional heading display 18 in situations where the compass sensors and circuitry are not yet calibrated or are adversely affected by their surroundings). For example, the compass sensors (such as magnetoresistive sensors or magnetoinductive sensors or the like) or compass circuitry or system of the communication system of the present invention may be operable in communication or cooperation with circuitry and components of the GPS control unit, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference. The GPS-derived locational or directional heading data or signals provided by the global positioning system control unit to the directional heading display system may include longitudinal and latitudinal locational or position data and may include height or altitude data, so that a vehicle location in three dimensional space may be established. The GPS-derived locational data or directional heading data or signals may be provided to the compass circuitry or system to facilitate calibration of the compass system or to provide directional heading data or information to the compass system in situations where the compass sensors may be adversely affected by external or local magnetic anomalies at or near the vehicle. Other GPS-derived data or information (such as time data and/or the like) may also or otherwise be provided to the directional heading display system or to another mirror-based or module-based system and/or display, without affecting the scope of the present invention.

Optionally, the compass system or sensors may be operable as an auxiliary system to the global positioning system control unit of the vehicle, which may be operable to provide the primary directional heading data or signal to the directional heading display. For example, the magnetoresponsive compass sensor or circuitry responsive to the earth's magnetic field may be operable in conjunction with the global positioning system control module to provide directional heading data to the global positioning system, such as disclosed in U.S. patent application Ser. No. 10/422,378, filed Apr. 24, 2003 by Schofield for IMAGING SYSTEM FOR VEHICLE, now U.S. Pat. No. 6,946,978, which is hereby incorporated herein by reference. The compass sensor/circuitry may provide such directional heading data to assist the global positioning system in maintaining tracking of the location of the vehicle, such as between waypoints or the like, when the satellite signal to the global positioning system is interrupted, such as may occur in cities between tall buildings (often referred to as "urban canyons") or the like. Other vehicle movement data may also be provided, such as vehicle speed data or vehicle odometer data or the like, to further assist in determining and tracking the location of the vehicle in situations where the satellite communication to the global positioning system of the vehicle may be temporarily interrupted or compromised. Optionally, an imaging system (such as described in U.S. patent application Ser. No. 10/422,378, filed Apr. 24, 2003 by Schofield for IMAGING SYSTEM FOR VEHICLE, now U.S. Pat. No. 6,946,978, which is hereby incorporated herein by reference) may be used to further assist in determining and tracking the location of the vehicle in situations where the satellite communication to the global positioning system may be temporarily interrupted or compromised. Because the magnetoresponsive sensor may thus be an auxiliary sensor to the main or primary GPS-based directional heading system, algorithms and complexities known for compass calibration and/or for obviation of vehicle deviating fields and/or for obviation of the affects of stray external magnetic anomalies (and/or for compensation of deviations in vehicle magnetic fields, such as may occur as the vehicle ages or the like) need not be utilized.

Alternately, the global positioning system control unit can serve as the sole directional sensing means and may be connected to or in communication with the directional heading display 18, and thus may obviate the need for a magnetoresponsive sensor or the like and associated circuitry that detect the local earth's magnetic fields, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, without affecting the scope of the present invention.

In such navigational or GPS-derived or GPS-based directional heading systems, the directional heading deduced may not be affected by vehicle sheet metal or local magnetic anomalies (such as bridges, signs, etc.). This is because the directional heading is deduced from signals, such as radio frequency signals or microwave signals or the like received from satellites, which are not affected by such local magnetic anomalies. Thus, traditional calibration and re-calibration of the compass system may not be needed, nor may there be any need to compensate for any vehicle magnetic field or change thereto over the lifetime of usage of the vehicle. Likewise, such a system does not require a zone input to set the compass system to the appropriate zone, since the GPS-derived data will indicate the geographic location of the vehicle irrespective of which zone the vehicle is in. It is envisioned that such a GPS-derived compass system may determine or deduce the directional heading as degrees from a particular direction, such as, for example, 42 degrees from a North heading or the like, and thus the directional heading output of the GPS-derived compass system may be displayed as degrees to provide a more accurate representation to the driver or occupant of the vehicle as to the actual directional heading of the vehicle.

The directional heading display 18 may provide directional heading information to a driver or occupant of the vehicle, such as at the reflective element 12*a* of the interior rearview mirror assembly, and may be viewable through the reflective element by the driver or occupant of the vehicle. Directional heading display 18 may comprise any type of display for displaying directional heading information to the driver or occupant of the vehicle. For example, the display may comprise a plurality of ports (such as ports or windows in the form of directional heading characters, such as N, S, E, W or N, NE, E, SE, S, SW, W, NW or the like) formed in the reflective coating of the reflective element. The display may include a plurality of illumination sources positioned behind and aligned with respective ports, such as disclosed in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and Ser. No. 10/933,842, filed Sep. 3, 2004 by Kulas et al. for INTERIOR REARVIEW MIRROR ASSEMBLY, now U.S. Pat. No. 7,249,860; and/or PCT Application No. PCT/US2004/015424, filed May 18, 2004 by Donnelly Corp. et al. for MIRROR ASSEMBLY FOR VEHICLE, and published Dec. 2, 2004 as International Publication No. WO 2004/103772, which are hereby incorporated herein by reference.

For example, the display may include four or eight illumination sources (preferably light emitting diodes) mounted on a printed circuit board and with the printed circuit board arranged behind the reflective element such that each of the individual illumination sources is behind and aligned with a respective one of the ports (which may be formed as the characters N, NE, E, SE, S, SW, W, NW) formed or etched in the reflective coating of the reflective element. Each of the illumination sources may be positioned on the printed circuit board such that it is aligned with, behind and emitting through a respective one of the ports (that are preferably created on the reflective element itself). Examples of such displays are described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and Ser. No. 10/933,842, filed Sep. 3, 2004 by Kulas et al. for INTERIOR REARVIEW MIRROR ASSEMBLY, now U.S. Pat. No. 7,249,860; and/or PCT Application No. PCT/US2004/015424, filed May 18, 2004 by Donnelly Corp. et al. for MIRROR ASSEMBLY FOR VEHICLE, and published Dec. 2, 2004 as International Publication No. WO 2004/103772, which are hereby incorporated herein by reference.

Optionally, the display may comprise other types of display elements and may be positioned at and viewable through the reflective element, such as at a display window or port at the reflective element. The window may be formed at the reflective element by etching or otherwise forming a window or port at the appropriate location in the reflective coating or layer of the reflective element. Optionally, the window or ports may be formed or defined by a variation in the physical thicknesses or refractive indices or characteristics of multiple reflective element layers or coatings to provide for selective transmission of the illumination emitted by the display elements while reflecting other light, such as described in PCT Application No. PCT/US03/29776, filed Sep. 19, 2003 by Donnelly Corporation et al. for MIRROR REFLECTIVE ELEMENT ASSEMBLY, and published Apr. 1, 2004 as International Publication No. WO 2004/026633, which is hereby incorporated herein by reference. For example, and as disclosed in International Publication No. WO 2004/026633 (such as, for example, at the paragraph beginning at line 4 of page 22 of the publication), the mirror reflective element (behind which the display is disposed so that the information displayed is visible by viewing through the mirror reflective element) of the mirror assembly may comprise a transflective mirror reflector, such that the mirror reflective element is significantly transmitting to visible light incident from its rear (i.e., the portion furthest from the driver in the vehicle), while simultaneously the mirror reflective element is substantially reflective to visible light incident from its front (i.e. the position closest to the driver when the interior mirror assembly is mounted in the vehicle). Optionally, a light diffuser and/or a spectral filter may be interposed between the light source and the rear of the reflective element. The compass processing circuitry (that typically includes digital circuitry including a microprocessor running compensation and other compass-related software) may be operable to energize or actuate one or more illumination sources or elements to display the directional heading of the vehicle to the driver. Optionally, the display may comprise other types of displays, such as alphanumeric characters or the like that may be adjusted or controlled to display the appropriate directional information, without affecting the scope of the present invention. The illumination sources or display elements may be mounted on a printed circuit board and the reflective element and printed circuit board may be incorporated, such as by snapping into place, on or within the casing of the mirror assembly, with minimal invasiveness to the casing and overall design and tooling of the mirror assembly.

Optionally, the communications or telematics system, such as ONSTAR® or the like, may function to receive traffic flow data or information and may provide such information to the driver of the subject vehicle. For example, the vehicle may include or provide a highway/road management/monitoring system that is operable to provide traffic information and alternate routes to a driver of a vehicle via the telematics system of the vehicle. The remote telematics concierge base or center or operator may receive traffic information from a traffic monitoring system. For example, such a traffic monitoring system may collect traffic information via cameras or the like positioned along a highway or road and may communicate traffic information (such as traffic congestion or accidents or stalled vehicles, etc.) in vehicles along that road or approaching that road via signs and displays positioned along that road or on other roads near or associated with that road and/or that communicate traffic flow/density data to governmental/municipal agencies and bodies (such systems are known in the art and implemented along many highways and freeways). The telematics operator/service may receive the traffic information from the monitoring system and may communicate such traffic information to the driver of the vehicle if the vehicle is heading toward a congested area. The information may be automatically provided to the driver of the vehicle (such as via a display or alert to the driver if the vehicle is heading toward a congested or backed up road or area, where the alert may be provided in response to a detection of the vehicle heading and location such as via a global positioning system or the like) or may be provided in response to a request from the driver of the vehicle. For example, if a driver requests from the telematics operator directions to a particular location (such as to a restaurant or the like), the telematics operator may check the traffic information along the preferred route and inform the driver of the traffic condition along that route, and may provide an alternate route if the traffic conditions are unfavorable.

The telematics system thus may assist the driver of the vehicle in avoiding unfavorable traffic conditions, such as due to backups or construction or accidents or the like. The information may be spoken to the driver by the telematics operator or may be provided via a display, such as an image display of the traffic conditions or a text display or iconistic display or the like, that alerts the driver to the unfavorable traffic conditions. The driver thus may be provided with variable routing information or directions to the desired location, depending on the traffic conditions along the preferred or optional or possible routes.

Optionally, the telematics system or concierge service may be operable to provide weather information or data to the vehicle to display or communicate the current weather at a selected destination and/or a weather forecast at the present vehicle location or selected destination. Such a weather service or function may be selected as an option with the concierge service and paid for by the user or owner of the vehicle. The user or driver of the vehicle may select such a feature and may notify the telematics operator of the desired information, whereby the operator or service may provide the requested information or data to the vehicle. The requested weather data may be provided when the request is made or, if desired, may be provided at a later time. For example, the driver may request the weather data and/or weather update and/or forecast for a particular destination and may request such information when the vehicle is approaching the destination, such as when the vehicle is about a half hour away from the destination or at some other time or distance from the destination. The telematics or concierge service may then communicate the requested weather data to the vehicle when the vehicle is at the appropriate time or distance from the destination. For example, a video slide out display (such as described below) may automatically extend and display the weather information at the appropriate time or location. Such a provision of weather data may be automatically provided when the telematics system detects the vehicle at the appropriate time or distance from the destination (such as via a global positioning system or the like) and may be audibly or visually (such as on a video display screen, such as a screen that may automatically extend (such as described below) to display such information at the appropriate time/location) conveyed/communicated to the driver of the vehicle.

Optionally, the telematics system and display may be operable to display weather warnings and the like, such as tornado warnings or the like, when an emergency situation exists. For example, the telematics service may receive a tornado warning from an emergency broadcast network or system and may provide notification and/or details of such a warning to the vehicle via the communication system and/or display of the vehicle. When such a warning is detected for a particular area, the telematics service may alert the vehicle if the vehicle is in that particular area, and may provide instructions as to how to avoid or leave the dangerous condition or otherwise how to act or where to go to minimize the danger. It is envisioned that such a feature or function may be offered as an option to users of the telematics service, and the service may communicate or send out such a warning or alert to all vehicles in the effected area that have that feature or function or option as selected by the owners or users of the vehicles.

Optionally, and similarly, the telematics service may be operable to provide other warnings or alerts to the vehicle or vehicles. For example, the service may provide train information pertaining to a train on railroad tracks that the vehicle is approaching. The telematics service may provide a warning that the train is approaching a crossing ahead of the vehicle (such as may be determined via global positioning systems of the train and the subject vehicle) or other information that may be desired. The train information may be obtained by utilizing aspects of the systems described in U.S. Pat. Nos. 6,690,268 and 6,553,308 and/or U.S. patent application Ser. No. 10/755,915, filed Jan. 13, 2004, now U.S. Pat. No. 7,446,650, and Ser. No. 09/585,379, filed Jun. 1, 2000, and Ser. No. 10/307,929, filed Dec. 2, 2002, now U.S. Pat. No. 6,902,284, which are hereby incorporated herein by reference.

Optionally, the telematics system and display may be operable to automatically display other information to the driver of the vehicle, such as personal data or appointment data, such as may be downloaded via a PDA or other planner or the like. The data, such as an alert or reminder that it is almost time for a scheduled appointment or the like, may be automatically provided to the driver at the appropriate or elected time (such as fifteen minutes before an appointment), and may be provided via automatic extension and activation of a display screen, such as described below.

Optionally, the telematics system and display may be operable to provide home security or home status or home utility information or data to the driver of the vehicle when the vehicle and driver are away from home. For example, the telematics service may receive information or signals from a home security system and may alert the driver of the vehicle when the home security system is triggered. Thus, if an alarm is activated at home, the driver may be alerted of the situation and may take the appropriate action. It is envisioned that a display or video image captured by a security camera at the home may be fed to the telematics service and thus may be fed to the vehicle display and displayed to the driver if desired (such as automatically or in response to a user input or election by the driver when the driver receives the alert or notification of the alarm being activated).

Optionally, the vehicle may include an accessory module or windshield electronic module positioned at or near or associated with the windshield of the vehicle. The accessory module may comprise any type of accessory module or windshield electronics module or console, such as the types described in U.S. patent application Ser. No. 10/355,454, filed Jan. 31, 2003 by Schofield et al. for VEHICLE ACCESSORY MODULE, now U.S. Pat. No. 6,824,281; and Ser. No, 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 6,690,268; 6,250,148; 6,341,523; 6,593,565; and 6,326,613, and/or PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, which are all hereby incorporated herein by reference.

The windshield electronic module and/or accessory module and/or interior rearview mirror assembly (or a compass pod or module or an accessory module associated with the mirror assembly) may include one or more accessories, such as one or more camera-based or imaging systems, such as a rain sensor (such as the type disclosed in commonly assigned U.S. Pat. Nos. 6,320,176; 6,353,392 and 6,313,454, which are hereby incorporated herein by reference), an image sensor (such as a video camera or imaging sensor, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference), or any other sensor or device. For example, the module or mirror assembly may include a forward facing video image sensor or system, which may include an intelligent rain sensor (such as the type disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003 by Schofield for IMAGING SYSTEM FOR VEHICLE, now U.S. Pat. No. 6,946,978, which are hereby incorporated herein by reference), an intelligent headlamp controller (such as the type disclosed in U.S. Pat. No. 5,796,094 and/or in U.S. patent application Ser. No. 10/355,454, filed Jan. 31, 2003 by Schofield et al. for VEHICLE ACCESSORY MODULE, now U.S. Pat. No. 6,824,281, which are hereby incorporated herein by reference), an intelligent lane departure warning system or object detection system, such as the type disclosed in U.S. patent application Ser. No. 10/427,051, filed Apr. 30, 2003 by Pawlicki et al. for OBJECT DETECTION SYSTEM FOR VEHICLE, now U.S. Pat. No. 7,038,577, which is hereby incorporated herein by reference, and/or the like. Optionally, the lane departure warning system may determine weaving or drifting of the vehicle across the lane markers along the road surface and may utilize such information to determine a driver condition or the like. The imaging sensor and/or control circuitry of the mirror assembly may be incorporated into or operable in conjunction with a vision system or imaging system of the vehicle, such as a rearwardly directed vehicle vision system utilizing principles disclosed in U.S. Pat. Nos. 5,550,677; 5,760,962; 5,670,935; 6,201,642; 6,717,610; and/or 6,757,109, which are hereby incorporated herein by reference, a trailer hitching aid or tow check system, such as the type disclosed in U.S. patent application Ser. No. 10/418,486, filed Apr. 18, 2003 by McMahon et al. for VEHICLE IMAGING SYSTEM, now U.S. Pat. No. 7,005,974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like.

Optionally, a headlamp control system of the vehicle may include an image sensor that is directed forwardly with a forward field of view. The headlamp control system may detect objects and light sources of interest in the forward field of view and may adjust a headlamp beam setting in response to such detections, and may utilize aspects of the headlamp control systems and imaging systems described in U.S. Pat. Nos. 5,550,677; 6,097,023; 5,796,094; 6,320,176; 6,353,392; 6,313,454; 5,760,962; 5,670,935; 6,201,642; 5,877,897; 6,690,268; 6,717,610; and/or 6,757,109, and/or U.S. patent application Ser. No. 10/422,378, filed Apr. 24, 2003 by Schofield for IMAGING SYSTEM FOR VEHICLE, now U.S. Pat. No. 6,946,978; Ser. No. 10/355,454, filed Jan. 31, 2003 by Schofield et al. for VEHICLE ACCESSORY MODULE, now U.S. Pat. No. 6,824,281; Ser. No. 10/427,051, filed Apr. 30, 2003 by Pawlicki et al. for OBJECT DETECTION SYSTEM FOR VEHICLE, now U.S. Pat. No. 7,038,577; Ser. No. 10/418,486, filed Apr. 18, 2003 by McMahon et al. for VEHICLE IMAGING SYSTEM, now U.S. Pat. No. 7,005, 974, and/or U.S. provisional applications, Ser. No. 60/562, 480, filed Apr. 15, 2004 by Schofield for IMAGING SYSTEM FOR VEHICLE; and Ser. No. 60/607,963, filed Sep. 8, 2004 by Schofield for IMAGING SYSTEM FOR VEHICLE, which are all hereby incorporated herein by reference.

Optionally, the imaging system may include a far infrared sensor or camera that is positioned at the vehicle and facing forwardly with a forward facing field of view. Such thermal imaging night vision systems are known, and preferably comprise a microbolometer array or equivalent. The far infrared sensor may be positioned exteriorly of the vehicle and may detect or sense heat sources or light sources emitting far infrared radiation or energy (such as far infrared radiation having wavelengths in the range of approximately 8-14 microns or thereabouts) in the forward field of view. Such thermal imaging night vision systems distinguish objects and people based on their thermal profile/difference compared to the background. The far infrared sensor thus may function to detect tail pipes and grills of other vehicles in the forward field of view (as these will be hotter than adjacent structure/parts of oncoming or leading vehicles) and the thermal image produced may be processed by an automatic headlamp controller that may utilize such information to determine if another vehicle is in the forward field of view (by distinguishing an oncoming vehicle grill or a hot exhaust tail pipe being approached) or even if a detected "hot spot" is a headlamp or taillight of a vehicle or the like. The headlamp controller thus may utilize such a far infrared sensor or heat sensor for a headlamp control function, such as changing from a high beam headlight condition to a low beam headlight condition when the hot grill of an approaching vehicle is detected, or the data from the thermal imaging system can be used to control an adaptive lighting function of the vehicle.

Optionally, such a far infrared sensor may also or otherwise be utilized in connection with a vision system, particularly for a night vision system or the like. Thus, the head lamp control function can be provided as an off-shoot of a night vision system (whether an active night vision system where the forward scene is illuminated with infrared lighting or a passive night vision system where the thermal emissions of the bodies being viewed are detected). Another functionality preferably combined is lane marker detection to provide a lane departure warning functionality. More preferably, a combined night vision functionality, automatic HI/LOW beam headlamp control functionality and lane departure warning capability is provided using the same forward facing imager array or camera. Other functionalities, such as adaptive cruise control, sign recognition, rain/fog sensing and pedestrian/object detection and the like, can be include with a forward facing vision system, and by utilizing the one camera or image sensor or imaging array.

Optionally, the windshield electronic module and/or accessory module and/or interior rearview mirror assembly (or a compass pod or module or an accessory module associated with the mirror assembly) may include or may be associated with other accessories, such as one or more electrical or electronic devices or accessories, such as antennas, including global positioning system (GPS) or cellular phone antennas, such as the type disclosed in U.S. Pat. No. 5,971,552, a communication module, such as the type disclosed in U.S. Pat. No. 5,798,688, a voice recorder, a digital network, such as the type described in U.S. Pat. No. 5,798,575, transmitters and/or receivers, such as a garage door opener or the like, such as the types described in U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, and/or U.S. Pat. Nos. 6,396,408; 6,362,771; and 5,798,688 (and may provide a storage compartment, such as for storing a hand held garage door opening device or transmitting device or the like), a digital network, such as the type described in U.S. Pat. No. 5,798,575, a memory mirror system, such as the type disclosed in U.S. Pat. No. 5,796,176, a hands-free phone attachment, a video device for internal cabin surveillance and/or video telephone function, such as the types disclosed in U.S. Pat. Nos. 5,760,962 and/or 5,877,897, a remote keyless entry receiver, a video mirror system, such as the types disclosed in commonly assigned U.S. Pat. Nos. 6,690,268; 6,428,172 and 6,420,975, and U.S. patent application Ser. No. 09/585,379, filed Jun. 1, 2000 for REARVIEW MIRROR ASSEMBLY WITH UTILITY FUNCTIONS; and Ser. No. 10/307,929, filed Dec. 2, 2002 by Hutzel et al. for AN INTERIOR REARVIEW MIRROR SYSTEM INCLUDING A PENDENT ACCESSORY, now U.S. Pat. No. 6,902,284, lights, such as map reading lights or one or more other lights or illumination sources, such as the types disclosed in U.S. Pat. Nos. 5,938,321; 5,813,745; 5,820,245; 5,673,994; 5,649,756; 5,178,448; 5,671,996; 4,646,210; 4,733,336; 4,807,096; 6,690,268; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as the types disclosed in U.S. Pat. Nos. 6,243,003; 6,278,377; and/or 6,420,975, and/or PCT Application No. PCT/US03/30877, filed Oct. 1, 2003, and published Apr. 15, 2004 as International Publication No. WO 2004/032568, speakers, a compass or compass system (which may include the compass sensing circuitry), such as the types disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a navigation system, such as the types described in U.S. Pat. Nos. 6,678,614 and 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978, a tire pressure monitoring system, such as the types disclosed in U.S. Pat. Nos. 6,731,205; 6,294,989; 6,124,647; 6,445,287; and/or 6,472,979, and/or U.S. provisional application Ser. No. 60/611,796, filed Sep. 21, 2004 by O'Brien for TIRE PRESSURE ALERT SYSTEM, a seat occupancy detector, a trip computer, a remote starter control, a yaw sensor, a clock, a carbon monoxide detector, a temperature sensor (such as a contact temperature sensor for measuring the temperature at or of the windshield), an antenna, status displays, such as displays that display a status of a door of the vehicle, a transmission selection (4wd/2wd or traction control (TCS) or the like), an antilock braking system, a road condition (that may warn the driver of icy road conditions), and/or any other desired accessory or system or the like (with all of the above-referenced patents and patent applications and provisional applications and PCT applications being commonly assigned to Donnelly Corporation, and with the disclosures of all of the above referenced patents and patent applications and provisional applications and PCT applications being hereby incorporated herein by reference in their entireties).

Optionally, the windshield electronic module and/or accessory module and/or interior rearview mirror assembly (or a compass pod or module or an accessory module associated with the mirror assembly) may include a display element, such as a video display element or the like, that may be viewable by a driver or occupant of the vehicle, such as to view vehicle information or captured images, such as images captured by an imaging system of the vehicle. For example, the display element may slide out or flip up or down from the housing or casing of the mirror assembly to provide a video screen that is viewable by the driver of the vehicle, such as a video display screen of the type described in PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540, which is hereby incorporated herein by reference. The video display screen may be operable to display information to the driver of the vehicle, and may be incorporated into or may be in communication with a vision system or imaging system of the vehicle, such as a rearwardly directed vehicle vision system utilizing principles disclosed in U.S. Pat. Nos. 5,550,677; 5,760,962; 5,670,935; 6,201,642; 6,717,610; and/or 6,757,109, which are hereby incorporated herein by reference, a trailer hitching aid or tow check system, such as the type disclosed in U.S. patent application Ser. No.

10/418,486, filed Apr. 18, 2003 by McMahon et al. for VEHICLE IMAGING SYSTEM, now U.S. Pat. No. 7,005,974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like. Optionally, the video display screen may also or otherwise serve as a screen for a navigation system of the vehicle or the like, such as a GPS-based navigation system, such as is known in the automotive art.

Optionally, the video display, such as in a mirror assembly or accessory module or pod or the like in the vehicle, may be operable or controllable to provide a text or image display of the vehicle's owners manual or the user manual or the like for the vehicle or other components or systems or accessories of the vehicle. The display or video mirror (or module or the like) may provide to a user the ability to pull up the user's manual and scroll through the different sections or portions of the manual. The display thus provides the information from the user's manual to the user or driver of the vehicle at the mirror or module and allows the user to scroll through the manual and select the desired section or topic to obtain the desired information, such as, for example, the instructions on how to control or adjust or set the radio and/or clock settings of the vehicle or the like.

It is further envisioned that the display may supplement the user's manual images or text or information with a video clip or animation or the like showing the user how to perform the desired task, such as adjusting or controlling an accessory or repairing an accessory or component or the like. For example, if a user selects the section on setting the clock of the vehicle, the user may read the instructions on how to set the clock, and then may view a video or animation of a person setting the clock. The display thus provides the desired instructions and information along with images or video clips of the instructions being carried out to enhance the instructions to the user or driver of the vehicle.

Optionally, the manual or information or video clips may include a vehicle orientation video that a user may watch shortly after purchasing their vehicle to learn about many of the features or accessories of the vehicle. Optionally, the display and selection of particular sections of the manual may be linked to the activation of a vehicle warning or fault indication, such as a low or flat tire inflation detection or a detection of an inactive or burned out or failed signal light or taillight or headlamp or the like. The display thus may provide a service instruction or repair instruction or help function, and may display the appropriate portion or section of the manual (which may show instructions or video clips on how to correct or repair or replace the detected fault or item) or other appropriate message (such as an alert to take the vehicle in for service or repair) automatically in response to a detection of a vehicle warning or fault or alert. For example, if a flat tire is detected, such as by a tire pressure monitoring system of the vehicle, the display may automatically display an alert and may display the section of the manual that shows how to change a tire of the vehicle.

Optionally, the display may provide, such as in connection with the telematics system or telematics or concierge service described above, instructions on where to go to have the tire repaired or where to go to have the failed light replaced or where to go to purchase a new light (along with instructions as to how to replace the light) or the like. It is envisioned that additional information pertaining to the repair shops or stores in the area of the vehicle may be provided via the telematics service. For example, directional instructions to the store may be provided along with a price or sale at the store for the damaged or failed item. The display may initially display only the alert that the item failed, and may display more details if such details are requested by the driver or user. It is envisioned that the display may have multiple levels of details or messages or information so that the driver or user may select and view more details or deeper messages only when such additional details are desired. Optionally, if desired or selected, the display may extend and display further information as the vehicle approaches the store or service station to remind the driver and/or provide additional instructions.

Optionally, the display may automatically display the particular or appropriate section or portion of the owner's or user's manual after the detection of the fault or error or problem and only after the vehicle is shifted into park (or when the vehicle slows to a threshold speed, such as at or below about 5 to 10 miles per hour or thereabouts), so that the display does not distract the driver of the vehicle while the vehicle is being driven. Optionally, the display may display the particular or appropriate section or portion of the manual after the detection of the fault or error or problem and after a user actuates a user input at the display (or elsewhere in the vehicle), so that a user may view the displayed information even while the vehicle is being driven or operated, if desired. Optionally, the display screen may partially extend from a housing (such as from the mirror assembly or accessory module of the vehicle, such as a display of the types described in U.S. Pat. No. 6,690,268 and/or U.S. patent application Ser. No. 10/755,915, filed Jan. 13, 2004, now U.S. Pat. No. 7,446,650, and/or PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540, which are hereby incorporated herein by reference) to provide an initial indication or alert to the driver, and may extend substantially or fully to display the instructions or message or video clip or the like in response to a user input or command by the driver upon seeing the initial indication or alert (such as described below). Optionally, if the user does not depress or actuate the user input, the display may automatically activate and display the appropriate information and/or images when the vehicle is shifted into park (or slows to a threshold speed, such as at or below about 5 to 10 miles per hour or thereabouts) following the detection or warning signal.

The owner's or user's manual or instructions and/or video images or clips may be downloaded and stored in a processor or control of the display or of the vehicle and may be uploaded and viewed as desired. Optionally, the instructions and/or video images may be downloaded on demand or as requested by a user, such as via the telematics system of the vehicle. For example, a user may scroll through a menu and select a desired function or feature of the vehicle from the menu, whereby the telematics system may download the instructions or manual and/or video clip for the desired function or feature from the remote telematics base. The user may then view the instructions and/or video clip to learn how to control or adjust or set or repair the selected function or accessory or component or the like of the vehicle.

Optionally, other information may be provided at the display, such as first aid information or instructions, that the driver or user may scroll through and select the desired topic. For example, if an accident or other health related emergency occurs, such as a vehicle crash or a snake bite or other injury or accident or illness, a user may access a first aid directory and scroll through the topics displayed and select the appropriate instructions. The display may display the instructions and may provide a video clip or image or animation to assist the user in understanding what to do to assist the injured person. The display may provide an emergency contact number and/or the communication system may provide a connection to the emergency contact if desired.

Optionally, the display may function as a video phone display, and may provide a display of call records or phone numbers or listings or the like to the user as desired or selected by the user. The display may be connected to a phone embedded in the vehicle or to a personal phone connected to the vehicle, such as via a Bluetooth connection or other wireless connections. For example, and such as described in PCT Application No. PCT/US03/40611, filed Dec. 19, 2003 by Donnelly Corp, et al. for ACCESSORY SYSTEM FOR VEHICLE, and published Jul. 15, 2004 as International Publication No. WO 2004/058540, and/or U.S. provisional application Ser. No. 60/607,963, filed Sep. 8, 2004 by Schofield for IMAGING SYSTEM FOR VEHICLE, which are hereby incorporated herein by reference, the accessory module and/or interior rearview mirror assembly or system of the vehicle may include a hands free phone system and display, and thus may include the interface driver, microphone or microphones, user inputs, speech recognition system and/or the like. The audio signal from the system of the module or mirror assembly is preferably linked to the radio head, such as to a plug or connector at the radio head that accepts external audio signals and mute signals. The system thus may mute the audio and effectively take over the speakers when the phone is in use. This connection to the vehicle audio or radio or speaker system may utilize a communication link, such as a Bluetooth communication protocol or link. The signals from the mobile or cellular phone to the mirror assembly or accessory module may be communicated via a Bluetooth link, while the signals from the mirror assembly or accessory module to the radio head may also be communicated via a Bluetooth link. The display, such as a transflective or display on demand display, may display at least some of the phone information, such as the number dialed, the incoming number, the status of the call, strength of signal, phone book, messages, and/or the like. Although described as utilizing a Bluetooth communication link or protocol, other communication links may be implemented, such as other short/restricted range radio frequency (RF) or infrared (IR) communication protocol. Optionally, the display may provide a video teleconferencing function when the telephone or communication system is connected to another video communication device. Optionally, and desirably, the display may only function in the video teleconference mode when the vehicle is in park or slowed to at or below a threshold speed, such as at or below 5 to 10 miles per hour or thereabouts.

Optionally, the display may comprise a video display screen that may slide out or flip up or down from the housing or casing of the mirror assembly to provide a video screen that is viewable by the driver of the vehicle, such as a video display screen of the type described in U.S. Pat. No. 6,690,268 and/or U.S. patent application Ser. No. 10/755,915, filed Jan. 13, 2004, now U.S. Pat. No. 7,446,650, and/or PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540, which are hereby incorporated herein by reference. The video display screen may substantially or fully extend (such as from a side of the mirror assembly and toward the passenger side of the vehicle) to display images to the driver, such as images captured by a rearward facing camera or imaging sensor to provide a backup aid to the driver of the vehicle. In such an application, the display screen may substantially or fully extend to provide such images in response to the vehicle being shifted to reverse. When the vehicle is shifted out of reverse, the display screen retracts so that it is not readily viewable by the driver.

Optionally, the display screen may be operable to partially or substantially (but not entirely) retract so that a portion of the display screen remains viewable by the driver of the vehicle. The viewable partial display screen may provide an alert signal, such as an icon or indicator or display or the like, at the partially extended and viewable portion of the display to alert the driver of a particular condition or situation or message or the like. Optionally, the display screen may be operable to partially retract from an extended position and/or to partially extend from a fully retracted position to provide such an alert signal or indication as described below.

Optionally, the display screen may provide an initial information display or alert that triggers further use of the display screen if desired by the user or driver. The alert indication may alert the driver of a condition or situation or event or the like (such as an indication of a received email message or phone message or the like or an indication of a sensed condition of the vehicle, such as, for example, a detection of an approaching waypoint of a navigation route or a change in tire pressure or the like), and the driver of the vehicle may be invited to respond to the initial display or alert and have the display screen fully extend to display the rest of the message or to display a message or information relating to or associated with the initial display or alert (for example, such as a description of a missed waypoint and instructions how to get back on course or such as a description of which tire pressure is low and what the pressure is in that tire). For example, the display screen may extend to alert the driver that an email message or phone message or voice message has been received, such as by displaying a message or icon that conveys to the driver or informs the driver of such a condition. The driver may then elect to view the email message (or view information or the like associated with the alert) by providing a user input, such as a voice command or a touch input or the like, whereby the display screen may fully extend in response to the user input and may display the email message or call records or other information or the like associated with the initial alert.

The display screen thus may provide an alert or indication to the driver of a condition or event or situation, and the driver may elect to see or learn more about the condition or event or situation via a user input or command. The display screen thus alerts the driver of certain conditions or events or situations and provides details of such conditions or events or situations only when directed to by the driver or occupant of the vehicle.

Optionally, and desirably, the display screen may extend only a small or modest amount from the mirror assembly (or from an accessory module or the like) when in the alert mode. For example, the display screen may extend toward the passenger side of the vehicle approximately ¼ to ½ inch or thereabouts when in the alert mode. The initial extension of the display screen thus may be sufficient to display an icon or other alert indication, but small enough so as to not interfere with the forward field of view of the driver. If the driver elects to view the associated message or information or the like, the driver may provide the appropriate input or command, whereby the display screen may extend the full amount from the mirror assembly or accessory module (such as approximately 2½ to 3 inches or thereabouts) and may display the associated information or message or the like.

Optionally, the alert display or message availability function may be provided by the viewable portion of the display screen that is partially extended when the display is activated in the alert mode. For example, the viewable portion of the display (or the entire display) may flash a particular color or provide other indication of the alert. Alternately, one or more indicators, such as light emitting diodes or the like, may be positioned at or along the outer edge or bezel of the display or at or along a bezel or casing of the mirror assembly or accessory module or the like, and may be activated or flashed to alert the driver of an alert condition. Optionally, the alert or indication may be provided at the mirror reflective element, such as via an icon or the like at a display of the mirror assembly, such as a display on demand or transflective type of display or the like. The driver may then activate the user input or display to have the display extend and display the message or instructions or the like in response to recognition of the activated or flashing indicator or display.

Optionally, the display screen may be selectively operable in one or more alert modes, where the display screen provides the alert indication or partial extension of the display screen for elected functions or conditions or events or the like. For example, a user or driver may select an email alert feature and/or a phone call alert feature and/or a voice message alert feature and/or a navigational aid alert feature or the like, and the display screen may provide the partial extension and alert indication for only the features or events or conditions selected by the user or driver. Such selection may be made by the driver at any time, such as when the driver initially purchases the vehicle or sets the vehicle settings to his or her desired preferences. Alternately, the display screen may be automatically operable in the alert mode to provide alert indications for a preselected set of features or conditions or events or the like (which may be preset for the particular vehicle or may be optionally selected and preset when ordering or manufacturing the vehicle or the like), without affecting the scope of the present invention.

The present invention thus provides a vehicle communication system that includes an interior assembly that includes a human-machine interface or accessory or device that is associated with and in communication with a vehicle-based or in-vehicle communication or telematics control unit or module via a connective link or pathway between the interior assembly (such as an interior rearview mirror assembly or module or pod or attachment at or near or associated with the mirror assembly) and the telematics control module in the vehicle. The connective link or pathway may comprise an existing wire or link that connects the human-machine interface (such as user actuatable inputs or microphones or the like) at the interior assembly to the in-vehicle telematics control module. The communication system includes a global positioning system control unit that is operable to provide GPS-derived vehicle location or position or directional heading data or signals and/or the like to at least one of the in-vehicle telematics control module and the interior assembly (such as to a directional heading display at the interior assembly for providing directional heading information to a driver or occupant of the vehicle) via the existing common connective link or pathway. The connective link provides a common link for communicating HMI signals and GPS-derived signals or data via the same link or pathway. The global positioning system unit may comprise a vehicle-based or telematics-based or in-vehicle GPS control unit that is positioned in or at or near or is otherwise associated with the in-vehicle telematics control module, whereby the GPS control unit may access and share and utilize the common connective link to communicate GPS-derived data or signals to the interior assembly, while the common connective link may provide HMI signals to the telematics control module from the human-machine interface at the interior assembly. Alternately, the GPS control unit may be positioned in or at or near or may be otherwise associated with the interior assembly, whereby the GPS control unit may access and share and utilize the common connective link to communicate GPS-derived data or signals to the in-vehicle telematics module, while the common connective link may provide HMI signals to the telematics control module from the human-machine interface at the interior assembly.

Therefore, the present invention provides a vehicle communication system that utilizes a single or common connective link or pathway to provide communication of HMI signals from the interior assembly to the in-vehicle communication or telematics control module and to provide communication of GPS-derived signals or data from a GPS control unit to either the interior assembly or the in-vehicle telematics control module remote from the interior assembly. The present invention thus provides an effective common connection between distinct accessories or systems, without requiring separate links or wires, and thus provides such a common connection without disturbing or adversely affecting the current or existing vehicle wiring and vehicle architecture or structure. The present invention thus provides a reduced cost option of providing GPS-derived data or signals to the interior assembly in applications where the in-vehicle telematics control module includes the GPS control unit and the interior assembly includes a human-machine interface associated with the telematics control module. The present invention also provides enhanced performance of a global positioning system by positioning the GPS control unit and antenna at a preferred location (such as at the mirror assembly or module generally at the windshield of the vehicle), while providing communication of GPS-derived data or signals to the vehicle-based telematics control module via an existing and common wiring or link between the in-vehicle telematics control module and a human-machine interface of the communication system at or near the interior assembly. The GPS control unit thus may be removed from the vehicle-based telematics control module and placed at the desired location without requiring additional wiring between the in-vehicle telematics control module and the remote GPS control unit.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An information display system for a vehicle, said information display system comprising:
   a display screen disposed at an interior cabin of a vehicle equipped with said information display system so as to be viewable by a driver of the equipped vehicle;
   wherein said information display system is operable to display on said display screen vehicle user information so as to provide information to the driver of the equipped vehicle related to use of the equipped vehicle;
   wherein said display screen is operable to display video images captured by a rearward facing camera of the equipped vehicle for assisting the driver during a reversing maneuver, and
   wherein said video images are captured by said rearward facing camera and are displayed on said display screen when the equipped vehicle is executing a reversing maneuver;

wherein, when the equipped vehicle is not executing a reversing maneuver, said information display system is operable to display on said display screen vehicle user information;

wherein said information display system is operable to automatically display on said display screen vehicle user information responsive to a triggering event, and wherein said triggering event comprises at least one of a vehicle warning condition and a vehicle fault condition; and wherein said displayed vehicle user information comprises instructions pertaining to how to service an accessory associated with said at least one of a vehicle warning condition and a vehicle fault condition.

2. The information display system of claim 1, wherein said displayed information comprises at least one of a text display and an image display.

3. The information display system of claim 1, wherein said information display system is operable to only display on said display screen vehicle user information when the equipped vehicle is one of (a) shifted into park, (b) traveling at a speed below a threshold speed and (c) stationary.

4. The information display system of claim 1, wherein said information display system is operable to access an electronically stored instruction.

5. The information display system of claim 4, wherein said electronically stored instruction pertains to an accessory of the equipped vehicle or pertains to the equipped vehicle itself.

6. The information display system of claim 5, wherein said information display system is operable so that the driver of the equipped vehicle can scroll through and access electronically stored instructions.

7. The information display system of claim 1, wherein said information display system downloads data via a telematics system of the equipped vehicle.

8. The information display system of claim 7, wherein said information display system is operable to display on said display screen instructions at least partially derived from said downloaded data.

9. The information display system of claim 1, wherein said displayed vehicle user information comprises information from a vehicle user manual of the equipped vehicle.

10. The information display system of claim 1, wherein said displayed vehicle user information comprises information pertaining to at least one of (a) a communication system, (b) a voice recorder, (c) a garage door opener, (d) a memory mirror system, (e) a phone, (f) a hands-free phone, (g) a video device, (h) a video device for internal cabin surveillance, (i) a telephone function, (j) a video telephone function, (k) a compass system, (l) a navigation system, (m) a tire pressure monitoring system, (n) a tire changing device, (o) a computer, (p) a trip computer, (q) a remote starter control, (r) a clock, (s) a radio, (t) a light, (u) an interior light, (v) an exterior light and (w) a telematics system.

11. The information display system of claim 1, further comprising an in-vehicle communication control and a human-machine interface located at an interior rearview mirror assembly, said human-machine interface being connected to said in-vehicle communication control via a connective link to communicate at least one human-machine interface signal between said human-machine interface and said in-vehicle communication control, and wherein a global positioning system communicates at least one GPS-derived signal to one of said interior rearview mirror assembly and said in-vehicle communication control via said connective link, said at least one human-machine interface signal and said at least one GPS-derived signal sharing said connective link such that said connective link comprises a shared common connective link between said in-vehicle communication control and said interior rearview mirror assembly.

12. The information display system of claim 1, wherein, responsive to a user input by the driver of the equipped vehicle, said information display system is operable to display on said display screen information comprising at least one instruction pertaining to an accessory of the equipped vehicle, and wherein said at least one instruction comprises at least one of (a) an instruction on how to operate said accessory or component thereof, (b) an instruction on how to control said accessory or component thereof, (c) an instruction on how to adjust said accessory or component thereof, (d) an instruction on how to repair said accessory or component thereof, and (e) an instruction on how to replace said accessory or component thereof.

13. The information display system of claim 1, wherein said display screen comprises one of an interior mirror display screen and a windshield electronics module display screen.

14. An information display system for a vehicle, said information display system comprising:

a display screen disposed at an interior cabin of a vehicle equipped with said information display system so as to be viewable by a driver of the equipped vehicle;

wherein said information display system is operable to display on said display screen vehicle user information so as to provide information to the driver of the equipped vehicle related to use of the equipped vehicle;

wherein said display screen is operable to display video images captured by a rearward facing camera of the equipped vehicle for assisting the driver during a reversing maneuver, and wherein said video images are captured by said rearward facing camera and are displayed on said display screen when the equipped vehicle is executing a reversing maneuver;

wherein, when the equipped vehicle is not executing a reversing maneuver, said information display system is operable to display on said display screen vehicle user information;

wherein said information display system is operable to access an electronically stored instruction, and wherein said electronically stored instruction pertains to an accessory of the equipped vehicle or pertains to the equipped vehicle itself;

wherein said information display system is operable so that the driver of the equipped vehicle can scroll through and access electronically stored instructions; and wherein said information display system, responsive to the driver selecting an instruction on how to adjust a clock or radio of the equipped vehicle, displays on said display screen information pertaining to the clock or radio of the equipped vehicle, and wherein said displayed information comprises at least one of (a) a text instruction pertaining to adjustment of the clock or radio of the equipped vehicle and (b) an image pertaining to adjustment of the clock or radio of the equipped vehicle.

15. An information display system for a vehicle, said information display system comprising:

a display screen disposed at an interior cabin of a vehicle equipped with said information display system so as to be viewable by a driver of the equipped vehicle;

wherein said information display system is operable to display on said display screen vehicle user information so as to provide information to the driver of the equipped vehicle related to use of the equipped vehicle;

wherein said display screen is operable to display video images captured by a rearward facing camera of the equipped vehicle for assisting the driver during a reversing maneuver, and wherein said video images are captured by said rearward facing camera and are displayed on said display screen when the equipped vehicle is executing a reversing maneuver;

wherein, when the equipped vehicle is not executing a reversing maneuver, said information display system is operable to display on said display screen vehicle user information;

wherein said information display system is operable to access an electronically stored instruction, and wherein said electronically stored instruction pertains to an accessory of the equipped vehicle and wherein said information display system is operable to display on said display screen said instruction as an animation showing the driver of the equipped vehicle how to operate or adjust the accessory of the equipped vehicle.

16. An information display system for a vehicle, said information display system comprising:

a display screen disposed at an interior cabin of a vehicle equipped with said information display system so as to be viewable by a driver of the equipped vehicle;

wherein said information display system is operable to display on said display screen vehicle user information so as to provide information to the driver of the equipped vehicle related to use of the equipped vehicle;

wherein said display screen is operable to display video images captured by a rearward facing camera of the equipped vehicle for assisting the driver during a reversing maneuver, and wherein said video images are captured by said rearward facing camera and are displayed on said display screen when the equipped vehicle is executing a reversing maneuver;

wherein, when the equipped vehicle is not executing a reversing maneuver, said information display system is operable to display on said display screen vehicle user information;

wherein said information display system downloads data via a telematics system of the equipped vehicle, and wherein said information display system is operable to display on said display screen instructions at least partially derived from said downloaded data; and wherein, responsive to at least one of (i) a user input, (ii) a vehicle warning condition and (iii) a vehicle fault condition, said information display system downloads data pertaining to a service provider near the current geographical location of the equipped vehicle.

17. An information display system for a vehicle, said information display system comprising:

a display screen disposed at an interior cabin of a vehicle equipped with said information display system so as to be viewable by a driver of the equipped vehicle;

wherein said information display system is operable to display on said display screen vehicle user information so as to provide information to the driver of the equipped vehicle related to use of the equipped vehicle;

wherein said display screen is operable to display video images captured by a rearward facing camera of the equipped vehicle for assisting the driver during a reversing maneuver, and wherein said video images are captured by said rearward facing camera and are displayed on said display screen when the equipped vehicle is executing a reversing maneuver;

wherein, when the equipped vehicle is not executing a reversing maneuver, said information display system is operable to display on said display screen vehicle user information; and wherein said information display system is operable to display on said display screen a vehicle orientation video to teach the driver of the equipped vehicle about features or accessories of the equipped vehicle.

18. The information display system of claim 17, wherein said information display system is operable to at least one of (a) display on said display screen vehicle user information responsive to a user input and (b) automatically display on said display screen vehicle user information responsive to a triggering event.

19. The information display system of claim 18, wherein said information display system is operable to only display on said display screen vehicle user information when the equipped vehicle is one of (a) shifted into park, (b) traveling at a speed below a threshold speed and (c) stationary.

20. The information display system of claim 19, wherein said information display system is operable to automatically display on said display screen vehicle user information responsive to a triggering event and wherein said triggering event comprises at least one of a vehicle warning condition and a vehicle fault condition.

21. The information display system of claim 17, wherein said information display system is operable to automatically display on said display screen vehicle user information responsive to a triggering event.

22. The information display system of claim 21, wherein said triggering event comprises at least one of a vehicle warning condition and a vehicle fault condition.

23. The information display system of claim 22, wherein said vehicle user information comprises at least one of (a) text pertaining to said at least one of a vehicle warning condition and a vehicle fault condition, (b) an icon pertaining to said at least one of a vehicle warning condition and a vehicle fault condition, (c) an image pertaining to said at least one of a vehicle warning condition and a vehicle fault condition, (d) an animation pertaining to said at least one of a vehicle warning condition and a vehicle fault condition and (e) a video clip pertaining to said at least one of a vehicle warning condition and a vehicle fault condition.

24. An information display system for a vehicle, said information display system comprising:

a display screen disposed at an interior cabin of a vehicle equipped with said information display system so as to be viewable by a driver of the equipped vehicle;

wherein said information display system is operable to display on said display screen vehicle user information so as to provide information to the driver of the equipped vehicle related to use of the equipped vehicle;

wherein said display screen is operable to display video images captured by a rearward, facing camera of the equipped vehicle for assisting the driver during a reversing maneuver, and wherein said video images are captured by said rearward facing camera and are displayed on said display screen when the equipped reversing maneuver;

wherein, when the equipped vehicle is not executing a reversing maneuver, said information display system is operable to display on said display screen vehicle user information; and wherein, responsive to a user input, said information display system is operable to display on said display screen first aid information.

25. The information display system of claim 24, wherein said displayed first aid information relates to treatment of a snake bite.

26. The information display system of claim 24, wherein said information display system is operable to display on said display screen at least one of a video clip, an image and an animation to assist the user in understanding how to assist an injured person.

27. The information display system of claim 24, wherein said information display system is operable to at least one of (i) provide an emergency contact number and (ii) connect the user to an emergency contact via a vehicle telematics system.

28. An information display system for a vehicle, said information display system comprising:
a display screen disposed at an interior cabin of a vehicle equipped with said information display system so as to be viewable by a driver of the equipped vehicle;
wherein at least one of (i) said information display system downloads data via a telematics system of the equipped vehicle and (ii) said information display system is operable to access an electronically stored instruction;
wherein said information display system is operable to display on said display screen vehicle user information so as to provide information to the driver of the equipped vehicle related to use of the equipped vehicle;
wherein said display screen is operable to display video images captured by a rearward facing camera of the equipped vehicle for assisting the driver during a reversing maneuver, and wherein said video images are captured by said rearward facing camera and are displayed on said display screen when the equipped vehicle is executing a reversing maneuver;
wherein when the equipped vehicle is not executing a reversing maneuver, said information display system is operable to display on said display screen vehicle user information;
wherein said information display system is operable to only display vehicle user information when the equipped vehicle is one of (a) shifted into park, (b) traveling at a speed below a threshold speed and (c) stationary;
wherein said information display system is operable to at least one of (a) display on said display screen vehicle user information responsive to a user input and (b) automatically display on said display screen vehicle user information responsive to a triggering event;
wherein, responsive to at least one of (i) a user input, (ii) a vehicle warning condition and (iii) a vehicle fault condition, said information display system downloads data pertaining to a service provider near the current geographical location of the equipped vehicle; and
wherein, responsive to at least one of (i) a user input, (ii) a vehicle warning condition and (iii) a vehicle fault condition, said information display system downloads data pertaining to automotive repair shops near the current geographical location of the equipped vehicle.

29. The information display system of claim 28, wherein said information display system is operable to access an electronically stored instruction and wherein said electronically stored instruction pertains to an accessory of the equipped vehicle or pertains to the equipped vehicle itself.

30. The information display system of claim 29, wherein said electronically stored instruction pertains to an accessory of the equipped vehicle and wherein said information display system is operable to display on said display screen said instruction as an animation showing the driver of the equipped vehicle how to operate or adjust the accessory of the equipped vehicle.

31. The information display system of claim 28, wherein said information display system downloads data via a telematics system of the equipped vehicle and wherein said information display system is operable to display on said display screen instructions at least partially derived from said downloaded data.

32. The information display system of claim 28, wherein said information display system is operable to automatically display on said display screen vehicle user information responsive to a triggering event, and wherein said triggering event comprises at least one of a vehicle warning condition and a vehicle fault condition.

33. The information display system of claim 32, wherein said displayed vehicle user information comprises instructions pertaining to how to service an accessory associated with said at least one of a vehicle warning condition and a vehicle fault condition.

34. The information display system of claim 28, wherein said information display system is operable so that the driver of the equipped vehicle can scroll through and access electronically stored instructions.

35. An information display system for a vehicle, said information display system comprising:
a display screen disposed at an interior cabin of a vehicle equipped with said information display system so as to be viewable by a driver of the equipped vehicle;
wherein said information display system is operable to display on said display screen vehicle user information so as to provide information to the driver of the equipped vehicle related to use of the equipped vehicle;
wherein said display screen is operable to display video images captured by a rearward facing camera of the equipped vehicle for assisting the driver during a reversing maneuver, and wherein said video images are captured by said rearward facing camera when the equipped vehicle is in reverse gear;
wherein, when the equipped vehicle is not in reverse gear, said information display system is operable to display on said display screen vehicle user information of the equipped vehicle; and
wherein, responsive to at least one of (i) a user input, (ii) a vehicle warning condition and (iii) a vehicle fault condition, said information display system downloads data pertaining to a service provider near the current geographical location of the equipped vehicle.

36. The information display system of claim 35, wherein, responsive to at least one of (i) a user input, (ii) a vehicle warning condition and (iii) a vehicle fault condition, said information display system downloads data pertaining to automotive repair shops near the current geographical location of the equipped vehicle.

37. The information display system of claim 35, wherein said information display system is operable to automatically display on said display screen vehicle user information responsive to a triggering event, and wherein said triggering event comprises at least one of a vehicle warning condition and a vehicle fault condition.

38. The information display system of claim 35, wherein said information display system is operable to only display vehicle user information when the equipped vehicle is one of (a) shifted into park, (b) traveling at a speed below a threshold speed and (c) stationary.

* * * * *

UNITED STATES PATENT AND TRADEMARK OFFICE
CERTIFICATE OF CORRECTION

| | | |
|---|---|---|
| PATENT NO. | : 8,095,260 B1 | Page 1 of 1 |
| APPLICATION NO. | : 13/229965 | |
| DATED | : January 10, 2012 | |
| INVENTOR(S) | : Kenneth Schofield and Troy O. Cooprider | |

It is certified that error appears in the above-identified patent and that said Letters Patent is hereby corrected as shown below:

Column 1
Line 13, "Ser," should be --Ser.--

Column 17
Line 26, "No," should be --No.--

Column 23
Line 15, "Corp," should be --Corp.--

Column 30
Line 58, Claim 24, Insert --vehicle is executing a-- after "equipped"

Signed and Sealed this
Tenth Day of April, 2012

David J. Kappos
*Director of the United States Patent and Trademark Office*